United States Patent
Casey et al.

(10) Patent No.: US 7,433,465 B2
(45) Date of Patent: *Oct. 7, 2008

(54) SYSTEMS AND METHODS FOR PROVIDING APPLICATION SERVICES

(75) Inventors: Steven M. Casey, Littleton, CO (US); Bruce A. Phillips, Erie, CO (US); Donald Brodigan, Broomfield, CO (US); Kurt A. Campbell, Lafayette, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1229 days.

This patent is subject to a terminal disclaimer.

(21) Appl. No.: 10/367,597

(22) Filed: Feb. 14, 2003

(65) Prior Publication Data

US 2004/0151161 A1 Aug. 5, 2004

Related U.S. Application Data

(63) Continuation-in-part of application No. 10/356,364, filed on Jan. 31, 2003, now Pat. No. 7,180,988, and a continuation-in-part of application No. 10/356,688, filed on Jan. 31, 2003, and a continuation-in-part of application No. 10/356,338, filed on Jan. 31, 2003.

(51) Int. Cl.
*H04M 11/00* (2006.01)

(52) U.S. Cl. ............... 379/413.02; 379/93.05; 379/93.07

(58) Field of Classification Search ......... 370/352; 379/90.01, 93.05–93.08, 399.01, 413.02, 379/413.03, 413.04
See application file for complete search history.

(56) References Cited

U.S. PATENT DOCUMENTS

| | | | |
|---|---|---|---|
| 5,202,765 A | 4/1993 | Lineberry | |
| 5,740,075 A | 4/1998 | Bigham et al. | |
| 5,784,683 A | 7/1998 | Sistanizadeh et al. | |
| 5,923,379 A | 7/1999 | Patterson | |
| 5,971,921 A | 10/1999 | Timbel | |
| 5,983,068 A | 11/1999 | Tomich et al. | |
| 6,209,025 B1 | 3/2001 | Bellamy | |
| 6,282,189 B1 | 8/2001 | Eames | |
| 7,180,988 B2 * | 2/2007 | Phillips et al. | 379/93.05 |
| 2003/0026416 A1 | 2/2003 | Fusco | |

OTHER PUBLICATIONS

Frank, Edward and Holloway, Jack; "Connecting the Home with a Phone Line Network Chip Set", IEEE Micro, Mar.-Apr. 2000, pp. 2-14.

* cited by examiner

*Primary Examiner*—Harry S Hong
(74) *Attorney, Agent, or Firm*—Townsend and Townsend and Crew LLP

(57) ABSTRACT

A network interface system is provided with an addressable application device and a processor. The addressable application device is adapted to interface with a transport medium internal to a customer premises. The processor is adapted to selectively process telecommunication information originating from a transport medium external to the customer premises. The processor is further adapted to transmit the processed telecommunication information to the addressable application device for implementation of an application over the transport medium internal to the customer premises in accordance with a state of the addressable application device. The addressable application device and the processor are disposed external to the customer premises.

37 Claims, 12 Drawing Sheets

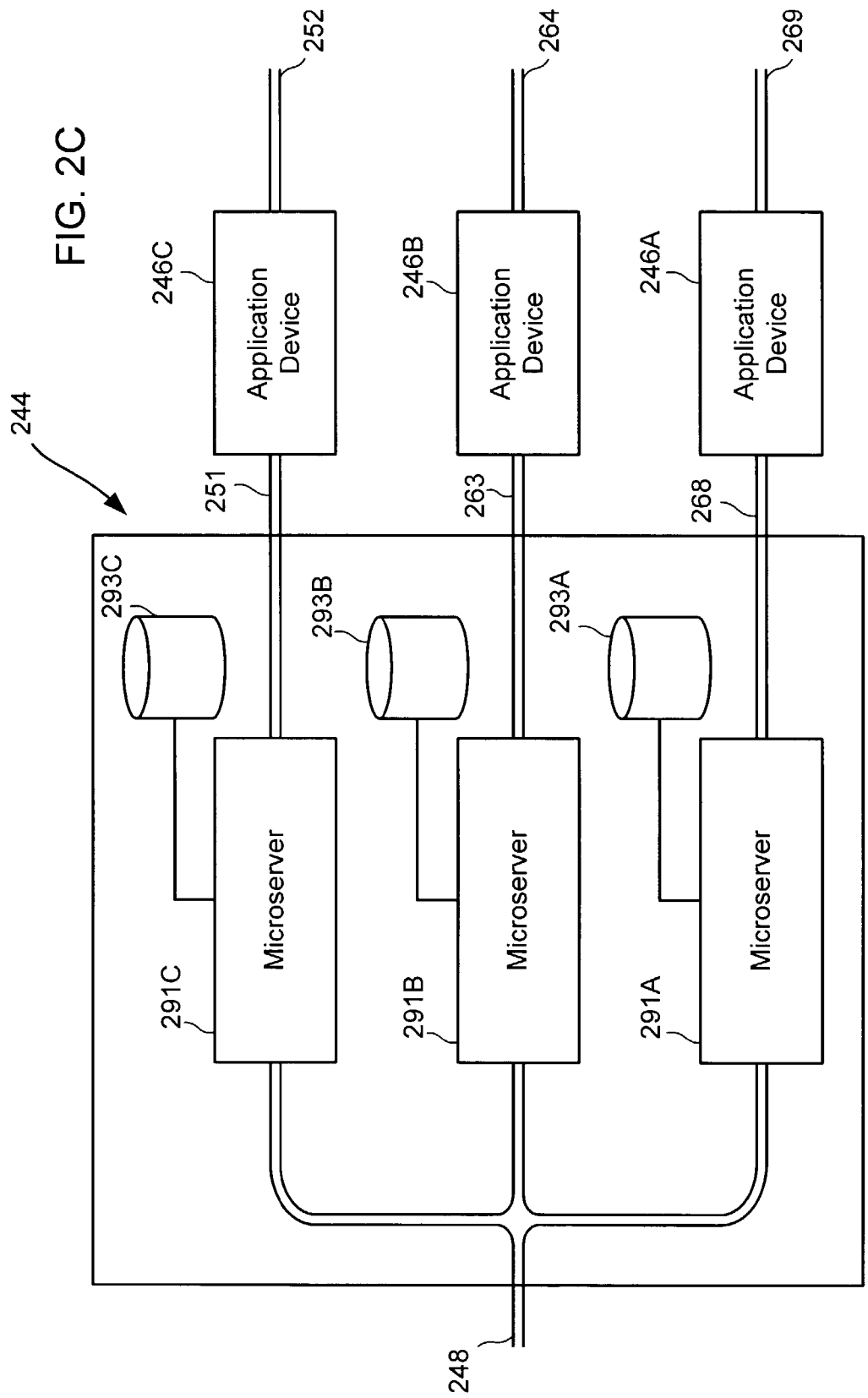

SYSTEMS AND METHODS FOR PROVIDING APPLICATION SERVICES

CROSS-REFERENCES TO RELATED APPLICATIONS

This application is a continuation-in-part application of U.S. patent application Ser. No. 10/356,364, entitled "PACKET NETWORK INTERFACE DEVICE AND SYSTEMS AND METHODS FOR ITS USE," filed Jan. 31, 2003 by Bruce A. Phillips et al.; is a continuation-in-part application of U.S. patent application Ser. No. 10/356,688, entitled "SYSTEMS, METHODS AND APPARATUS FOR PROVIDING A PLURALITY OF TELECOMMUNICATION SERVICES," filed Jan. 31, 2003 by Bruce A. Phillips et al.; and is a continuation-in-part application of U.S. patent application Ser. No. 10/356,338, entitled "CONFIGURABLE NETWORK INTERFACE DEVICE AND SYSTEMS AND METHODS FOR ITS USE," filed Jan. 31, 2003 by Bruce A. Phillips et al., the entire disclosure of each of which is herein incorporated by reference for all purposes.

BACKGROUND OF THE INVENTION

In the past, there has been a lack of consistent interface between telecommunication service providers' networks and their customers' premises wiring. For instance, telephone service often has been hard-wired to the customer's premises wiring by a variety of methods, rendering service calls unnecessarily complicated and intrusive. Such services calls often required service personnel to enter the customer premises, creating logistical issues for the telecommunication service provider and increasing customer frustration. Moreover, the lack of any discrete interface between the customer's premises wiring and the provider's network sometimes forced the use of proprietary hardware from the customer's perspective and limited the provider's flexibility when considering options to upgrade or otherwise modify the network.

This problem has been exacerbated by the increased number of telecommunication services provided to customer premises. For instance, many telecommunication service providers now provide xDSL service to their customers, but those skilled in the art will recognize that there is little (if any) standardization among providers. Thus, implementations vary widely, each requiring different hardware and software configurations to be operable, and customers have little flexibility in choosing hardware. For instance, ADSL service frequently is deployed differently than VDSL service, and ADSL deployments themselves can vary from provider to provider. Likewise, telephone wiring schemes can vary widely among customer premises, requiring different types of hardware to enable and enhance services, such as filters to control interference, and the like. Further, a typical customer premises has multiple wiring networks, including one for video distribution (cable, satellite, VDSL, and the like), one for data distribution (Ethernet or the like, perhaps with a connection to an xDSL modem or cable modem), and another for telephone service, and these networks generally operate independently of one another. And if a customer wants to add a new telecommunication service, an expensive service call (often including one or more new cable drops and/or the installation of new premises wiring) likely will be required.

Accordingly, there is a need in the art for methods and systems to address these and other problems.

BRIEF SUMMARY OF THE INVENTION

Embodiments of the invention thus provide a network interface system that overcomes certain deficiencies of the prior art. The network interface system comprises an addressable application device and a processor. The addressable application device is adapted to interface with a transport medium internal to a customer premises. The processor is adapted to selectively process telecommunication information originating from a transport medium external to the customer premises. The processor is further adapted to transmit the processed telecommunication information to the addressable application device for implementation of an application over the transport medium internal to the customer premises in accordance with a state of the addressable application device. The addressable application device and the processor are disposed external to the customer premises.

In one embodiment, addressable application device and the processor are disposed on an exterior wall of the customer premises. In some instances, the addressable application device and the processor are disposed within a common housing. Also, the network interface system may further comprise a service interface for addressing the addressable application device. The service may be a physical interface or may be a logical interface in different embodiments. In addition, the network interface system may further comprise an isolation device interfaced with the processor and adapted to isolate the transport medium internal to the customer premises from the transport medium external to the customer premises. In some embodiments, the isolation device may be further adapted to mediate a flow of the telecommunication information between the transport media internal and external to the customer premises. In some instances, the telecommunication information may comprise voice signals and non-voice-signals, in which case the isolation device may be further adapted to separated the voice signals from the non-voice signals.

The telecommunication information may be provided by a telecommunications service provider who maintains the transport medium external to the customer premises. In such cases, the transport medium internal to the customer premises may be maintained by a customer of the telecommunications service provider. In one embodiment, the transport medium external to the customer premises comprises an asynchronous transfer mode network.

The network interface system may accommodate multiple transport media external to the customer premises and may accommodate multiple addressable application devices. Thus, in one embodiment, the processor is further adapted to selectively rout telecommunication information originating from a second transport medium external to the customer premises to the addressable application device for implementation of the application over the transport medium internal to the customer premises in accordance with the state of the addressable application device. In another embodiment, the processor is further adapted to selectively route the telecommunication information to a second addressable application device for implementation of a second application over the transport medium internal to the customer premises in accordance with a state of the second addressable application device. The second addressable application device may be disposed external to the customer premises.

Embodiments of the invention also provide a method for providing telecommunication information to a transport medium internal to a customer premises. The telecommunication information is received from a transport medium external to the customer premises with a processor. The received telecommunication information is selectively processed with the processor. The processed telecommunication information is transmitted to an addressable application device disposed external to the customer premises. Thereafter, an application is implemented over the transport medium internal to the customer premises with the addressable application device. The addressable application device may further be addressed to change a state of the addressable application device that defines an implementation of the application. This may be performed by interacting physically or by interacting logically with a service interface of the addressable application device in different embodiments.

The method may further comprise isolating the transport medium internal to the customer premises from the transport medium external to the customer premises. In some embodiments, the method may include mediating a flow of telecommunication information between the media internal and external to the customer premises. In instances where the telecommunication information comprises voice signals and non-voice-signals, the method may further comprise separating the voice signals from the non-voice-signals. In one embodiment, the telecommunication information may also received from a second transport medium external to the customer premises with the processor. In another embodiment, the processed telecommunication information may be transmitted to a second addressable application device and a second application may be implemented over the transport medium internal to the customer premises with the second addressable application device.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a capital-letter sublabel is associated with a reference numeral and follows a hyphen to denote one of multiple similar components. When reference is made to a reference numeral without specification to an existing sublabel, it is intended to refer to all such multiple similar components.

FIGS. 2A-2C provide schematic illustrations of network interface systems according to embodiments of the invention;

DETAILED DESCRIPTION OF THE INVENTION

1. Introduction

Figure 1A:
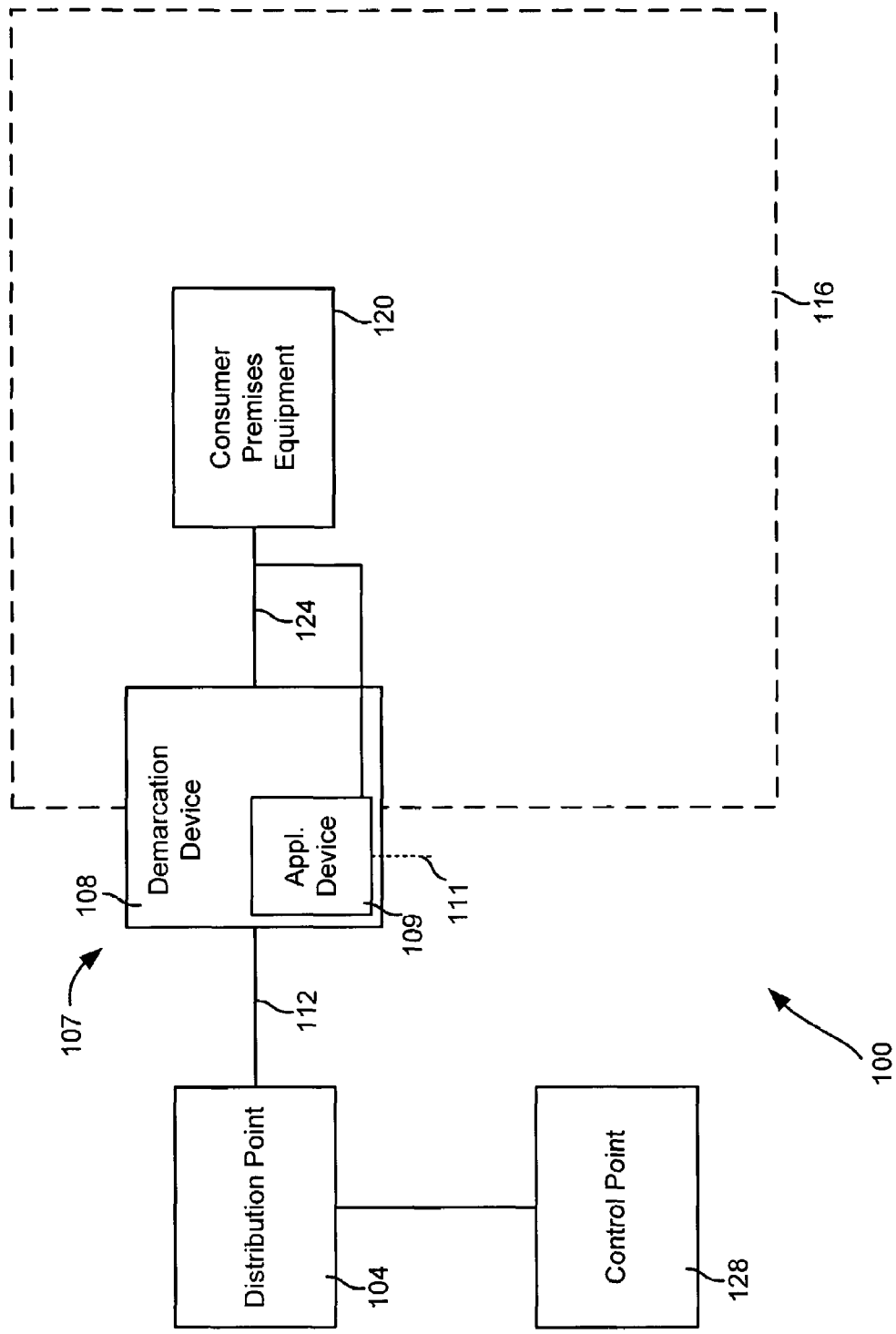
FIGS. 1A-1G provide schematic illustrations of embodiments of the invention that use demarcation and application devices to provide a network interface system.

Embodiments of the invention are directed to methods and systems for providing application services. The scope of application services that may be provided is broad, and includes such examples as may be broadly classified as including communications application services, informational application services, diagnostic application services, monitoring application services, and data storage application services, among others. Several specific examples of application services that may be provided are discussed in greater detail below.

In embodiments of the invention, the application services may be provided through the use of a network interface system that is capable of interfacing between a customer premises and a telecommunication service provider's network. In some instances such an interfacing capability is performed by elements of a "demarcation device," and specific examples of how the demarcation capabilities arise in different embodiments of the network interface systems are discussed below. Merely by way of illustration, such demarcation capabilities may derive from elements comprised by the following examples of demarcation devices: a set-top box, which may be used inter alia as an interface between a customer's video appliance and a provider's video network; broadband modems, including xDSL modems, cable modems, and wireless modems, each of which may be used to provide video and/or data to a customer premises; integrated access devices, which may, for example, translate between Voice over IP ("VoIP") signals and traditional telephone signals, allowing traditional telephones to connect to a VoIP network; devices compatible with the session initiation protocol ("SIP"); and the like. One particular demarcation device whose elements may be used to provide demarcation capabilities includes a network interface device ("NID"), described in detail below. In some instances, a demarcation device may additionally include other capabilities, including, for example, the capability to separate received telecommunication information into discrete sets; the capability to process certain of the separated sets independently from other sets; and/or the capability to transmit different of the separated sets to different locations, perhaps through the use of different interfaces.

In describing embodiments of the invention, references to "customer premises" are intended to refer to physical structures under the control of a customer through ownership, leasehold, or any other property right. The term is not intended to encompass open real property external to the physical structures, even if such open real property is also under the control of the customer. Such a definition reflects differences in accessibility to the physical structures and surrounding open real property. Access to the physical structures generally requires the presence of the customer or a representative of the customer, while access to the surrounding open real property may be obtained by permission from customer, through an easement, or by other means that does not require the physical presence of the customer. Thus, for example, in the case of a residential customer, the customer premises may correspond to the customer's home, but does not include the yard surrounding the home. Access to the yard may be obtained even when the customer is not home, such as when the customer is at work, is shopping, or is otherwise unavailable to be physically present.

As used herein, the term "telecommunication information" is broadly defined to include any information that can be transmitted or carried by a telecommunication service provider's network (e.g., the Public Switched Telephone Network or "PSTN") or by any other telecommunication network, including but not limited to the Internet. Such information includes, for example, voice signals (e.g., Plain Old Telephone Service or "POTS," as the term is known to those skilled in the art), audio and video signals (encoded in any standard and/or proprietary, digital and/or analog format now known or hereafter developed, using any of a variety of means known to those skilled in the art, such as HDTV, NTSC, PAL, and SECAM formatting, as well as, for example any of the MPEG digital encoding and/or compression algorithms), and data. Such data can be formatted according any of a variety of protocols familiar in the art, including in particular the Internet Protocol.

In this application, the term "telecommunication service provider" refers to any entity that provides telecommunication service to a customer's premises, including, merely by way of example, incumbent local exchange carriers, competitive local exchange carriers, cable television carriers, and satellite providers, to name a few. In contrast, the term "telecommunication information provider," means any entity that is capable of serving as a source of telecommunication information. In many cases, a particular entity may be considered both a telecommunication service provider and a telecommunication information provider, for instance, when a local exchange carrier provides Internet service to a customer, as well as the external transport medium attached to that customer's premises. In other cases, the two may be separate entities. For instance, according to certain embodiments of the invention, a cable television provider could contract with a local exchange carrier to provide broadcast television signals to a customer premises using the local exchange carrier's network and/or an external transport medium operated by the local exchange carrier.

The term "telecommunication information set" is intended to describe a discrete subset of the telecommunication information transmitted across a particular transport medium and/or received by a device having demarcation capabilities. Generally, the telecommunication information that is classified part of a particular information set shares a common characteristic. Merely by way of example, an information set can comprise telecommunication information of a particular type, such as voice, IP data, encoded video, and such; information associated with a particular application, such as information assigned to a specific IP port, as is known in the art; information addressed to or received from a particular device or network segment; information received within a particular reception window; and the like.

In certain embodiments, demarcation capabilities can support the one-way flow of telecommunication information, such as exemplified by the case of a simple set top box, which can receive data representing a video signal, decode that data, and transmit a video signal to an attached television. In other embodiments, demarcation capabilities can support bidirectional flow of telecommunication information. One such example is an xDSL modem, which allows the transmission of data both to and from a customer premises. In still other embodiments, the demarcation capability can support both unidirectional and bidirectional information flows simultaneously, depending on the type of telecommunication information transmitted or the source of the information.

The demarcation capabilities may also function to isolate the telecommunication service provider's network from the network at the customer premises. As described in detail below, the service provider's network is one example of an "external transport medium" and the customer's network is one example of an "internal transport medium." The external transport medium and internal transport medium are each examples of a "transport medium," which is used herein to describe any cable, wire, or other medium capable of carrying telecommunication information, including, but not limited to, twisted pair copper wiring (shielded or unshielded, including, for example, unshielded cables complying with industry-standard categories 3, 5, 5e and 6), optical fiber, and coaxial cable. Other examples of transport media include universal serial bus ("USB") cable, cable complying with the Institute of Electrical and Electronics Engineers' ("IEEE") 1394 standard, as well as any medium capable of complying with the many local-area networking standards known in the art. The preceding are examples of transport media that comprise physical media, but the invention is not limited to the use of physical media. In other embodiments, a transport medium may comprise any of a wide variety of wireless transmissions, including infra-red transmissions, radio frequency ("RF")  transmissions, and transmissions complying with standards developed by any of the IEEE's working groups governing wireless communication (e.g., the 802.11, 802.15, 802.16 and 802.20 working groups), as well as point-to-point microwave, satellite, cellular/PCS, and/or ultra wideband transmissions, among others.

In certain embodiments, demarcation capabilities can define an active demarcation point, serving to isolate the external transport medium from the internal transport medium (perhaps via an isolation device, discussed below), such that operational changes in one network do not affect the other network. "Operational changes" can include any changes in the structure, topology, format, protocol, bandwidth, media, and/or other operational parameters of a network. This isolation feature can provide many benefits; for instance, the demarcation capability can be realized by a disclosed interface between a customer premises and a provider's network, allowing the provider to implement changes in its network without disrupting the service provided to the customer.

Likewise, the isolation of the internal transport medium from the external transport medium can allow for any variety of customer premises equipment ("CPE") to be used at the customer premises without fear that the equipment might be incompatible with a particular telecommunication service provider's standards. "Customer premises equipment" and "CPE" are intended to refer to any device that sends, receives, or otherwise utilizes telecommunication information. Moreover, the demarcation capabilities might serve to couple a plurality of external and/or internal transport media, allowing interoperation among them all, and to provide the same isolation features among all of these media.

In this way, certain aspects of the demarcation capabilities can allow for sales of a wide variety of CPE on a consumer electronics model, instead of the proprietary model necessitated by many of today's telecommunication networks, where, for example, differing implementations of xDSL among providers virtually force consumers to purchase modems from the providers to ensure compatibility between the modem and the provider's xDSL implementation. By isolating the topologies of the external and internal transport media, embodiments of the present invention can create a disclosed interface between the provider's network and the customer's network, allowing much greater flexibility in both the provider's networking options and the customer's choice of telecommunication appliances. Those skilled in the art will recognize that these and many other benefits result from embodiments of the invention.

In accordance with other embodiments, the isolation abilities also allow insulation between different transport media coupled to the internal and external transport media in order. This may permit, for example, preventing unwanted telecommunication information of one network from entering the other network. For instance, a demarcation capability of a network interface system in accordance with particular embodiments can serve to prevent propagation of certain telecommunication information from an internal network (including particular signals or frequencies) into one or more external transport media, preventing interference in the internal transport medium from interfering with the telecommunication service provider's network. In similar fashion, demarcation capabilities can prevent the contamination of the internal transport medium with unwanted information from the external medium, interference between two or more external transport media coupled, and unwanted interference or crosstalk between multiple internal media.

In some embodiments, the isolation of the internal transport medium from the external transport medium resulting from the demarcation capabilities also allows enhanced security to be provided for the customer and/or to control customer access to certain features or services. For instance, those skilled in the art will recognize that demarcation capabilities can prevent unauthorized access to the customer's data network, such as by a telecommunication service provider and/or a third party, or can screen or filter telecommunication information entering or leaving the customer's premises. This enables features such as parental controls to be placed on incoming and outgoing information, as well as filtering of outgoing sensitive information, such as credit card information and the like.

Further, according to certain embodiments, the demarcation capabilities may be used to define a consolidation point for all telecommunication information entering or leaving the customer premises. Definition of such a consolidation point permits a variety of enhanced features to be provided to the entire premises, including features such as caller identification, premises-wide telephone, video and data distribution, content on demand, including video, audio, and/or data on demand, and the like. These and other features resulting from demarcation capabilities also allow for a variety of new and useful telecommunication applications to be provided to customers. Specific details of some exemplary applications are discussed below; given the disclosure herein, those skilled in the art can appreciate the wide variety of such applications that are possible using various embodiments of the invention.

In a number of embodiments, the demarcation capability is applied specifically to a customer premises, thereby separating a transport medium internal to the customer premises from a transport medium external to the customer premises. Moreover, the demarcation is exploited to provide one or more addressable application devices in a configuration that permits services to be provided by the application devices to the entire premises. For example, the addressable application devices may be disposed external to the customer premises, as may be one or more processors. The addressable application devices may be adapted to interface with the transport medium internal to the customer premises, and the processors may be adapted to selectively process telecommunication information originating from the transport medium external to the customer premises. Applications may be implemented through transmission of the processed telecommunication information from the processors to the addressable application devices. Not only does such a configuration permit applications to service the entire premises, disposing the addressable application devices external to the customer premises makes them easily accessible by technicians as need for service or to change their operational states.

2. Organizational Configurations

There are numerous organizational configurations that may be used in accordance with embodiments of the invention. Several examples are shown schematically in FIGS. 1A-1G, although such examples are not intended to be exhaustive. A relatively simple arrangement is shown in FIG. 1A, which illustrates a configuration 100 for providing telecommunication services. The configuration 100 includes a distribution point 104 in communication with a device 108 having demarcation capabilities via an external transport medium 112. In this example, the external transport medium 112 comprises a transport medium external to a customer premises 116. The device 108 is shown in FIG. 1A as including an application device 109, which is adapted to interface with an internal transport medium 124. In this example, the internal transport medium 124 comprises a transport medium internal to the customer premises 116. While the application device 109 is shown as part of the demarcation device 108, this is not a requirement. In other instances, the application device 109 may be distinct from, but coupled with, the demarcation device 108, such as by using a modular design with plug-and-play technology. Other examples discussed below illustrate different ways in which the demarcation and application devices 108 and 109 may be configured as integrated or separate devices. For convenience, however, the combination of the demarcation 108 device and application device 109 is sometimes referred to in a particular embodiment as an "application network interface device" ("ANID") 107 irrespective of whether they are integrated or separate.

In one sense, the distribution point 104 may be considered to be a source of telecommunication information transmitted to the customer premises and a recipient of telecommunication information transmitted from the customer premises; as described below, however, the distribution point 104 need not be either the ultimate source nor the ultimate recipient of telecommunication information. In certain embodiments, the distribution point 104 may correspond to a telecommunication service provider's local office. In other embodiments, the distribution point may correspond to another network element in the service provider's network, such as a remote termination cabinet and/or a digital subscriber line access multiplier ("DSLAM"). More generally, the distribution point 104 may correspond to any facility operated by a telecommunication service provider that is capable of transmitting telecommunication information to, and/or receiving telecommunication information from, a customer premises 116.

In general, distribution points can be classified, inter alia, as discrete distribution points or complex distribution points. With respect to a particular information set, a discrete distribution point often transmits only the necessary or desired information to the ANID 107. In contrast, a complex distribution point can transmit the entire information set to the ANID 107. The contrast may be illustrated with regard to video distribution: A discrete distribution point may perform channel switching (at the request of the demarcation device 108), encoding and sending only the desired channel information to the demarcation device 108. In contrast, a complex distribution point might rely upon the demarcation device 108 to perform all channel switching. Those skilled in the art will appreciate that each scheme presents relative advantages and disadvantages.

Distribution point 104 can be capable of transmitting and/or receiving any type of telecommunication information to/from the ANID 107, and such telecommunication information can be organized into a plurality of telecommunication information sets, as necessary. For ease of description, FIG. 1A does not show any additional sources or recipients of telecommunication information in communication with distribution point 104, but, those skilled in the art will recognize that, in many embodiments, distribution point 104 can be coupled to multiple customer premises 116 (perhaps via an ANID 107 at each customer premises) and often is neither the ultimate source nor the ultimate recipient of telecommunication information. Instead, distribution point 104 usually serves as an intermediary between one or more customer premises 116 and one or more larger telecommunication networks and/or telecommunication information providers, which, as discussed above, can include cable television networks, telephone networks, data networks, and the like. Further, many such networks (as well as, in some embodiments, distribution point 104) can be coupled to the Internet, so that distribution point 104 can serve as a gateway between customer premises 116 and any source and/or recipient of telecommunication information that has a connection to the Internet. The interconnection of telecommunication networks is well known in the art, although it is specifically noted that distribution point 104 can be configured to transmit telecommunication information to (and receive telecommunication information from) virtually any source or recipient of telecommunication information, through either direct or indirect (e.g., through the Internet) communication. Merely by way of example, a distribution point 104 can transmit video signals received from a television programming provider to customer premises equipment, as described in the applications referenced above. In other embodiments, distribution point 104 can be in communication with one or more other customer locations, allowing for private virtual circuits, vlan tags and wavelengths, or rf connections between customer premises 116 and those locations.

In configuration 100, the ANID 107 can serve as the interface between external transport medium 112 and customer premises 116. As shown in FIG. 1A, usually both the demarcation device 108 and the 109 comprised by the ANID 107 are interfaced with the internal transport medium 124, with the demarcation device interfaced with the external transport medium 112, although other interfacing configurations are also within the scope of the invention. For example, the application device 109 may additionally be interfaced with the external transport medium 112. The application device may also include a service interface 111 for addressing the application device 109. The service interface 111 may comprise a physical interface, such as a universal serial bus ("USB"), FireWire (IEEE 1394), registered jack 11 ("RJ-11"), registered jack 13 ("RJ-13"), registered-jack 45 ("RJ-45"), serial, coax, or other physical interface known to those of skill in the art. In other embodiments, the service interface 111 may comprise a logical interface, such as may be provided through a logical connection with an IP address.

As conceptually illustrated in FIG. 1A, demarcation device 108 and/or application device 109 may be attached to an external wall of the customer premises 116. Such attachment may be performed of an integrated ANID 107 or may be performed with the components separately of a separated ANID 107. Such a configuration provides many advantages. For instance, if the telecommunication service provider desires to upgrade or otherwise change its network, including, perhaps, external transport medium 112, a technician can perform any necessary changes at demarcation device 108 and/or application device 109 as appropriate without entering the customer premises. Coupled with the ability of some demarcation devices 108 to isolate the telecommunication service provider's network from the customer's premises, this can allow the telecommunication service provider to effect substantial changes in it network without impacting or inconveniencing the customer in any respect. This could, for example, allow the telecommunication service provider to upgrade external transmission medium 112 from a copper twisted pair to optical fiber, without requiring any topological changes inside the customer premises 116. Of course, demarcation device 108 and/or application device 109 may be located at a variety of alternative locations, either within customer premises 116 or at a facility operated by the telecommunication service provider. In addition, as previously noted and as discussed in further detail below, an ANID 107 may also be divided, with different portions situated at different locations, according to the requirements of the implementation.

The application device 109 is configured so that it may communicate with CPE 120, which may be located interior to the customer premises through internal transport medium 124. Such communication is used to implement applications defined by the application device 109 with the CPE 120 in accordance with telecommunication information received from the distribution point 104. In addition, the demarcation device 108 may communicate directly with CPE 120 to implement other functions. While the internal transport medium 124 may comprise any of the media discussed above, in one embodiment it comprises existing telephone wiring in customer premises 116 and, in some embodiments, is capable of carrying voice, data and video information. For instance, as described in Edward H. Frank and Jack Holloway, "Connecting the Home with a Phone Line Network Chip Set," IEEE Micro (IEEE, March-April 2000), which is incorporated herein by reference, the Home Phoneline Networking Alliance ("HPNA") standards allow for simultaneous transmission of both voice information and Ethernet frames across twisted-pair copper telephone wiring. In addition to the transmission of telecommunication information through the ANID 107, either directly from the demarcation device 108 or through the application device 109, telecommunication information may be transmitted via the reverse path to the distribution point 104. Such telecommunication information received at the distribution point 104 may be transmitted to an information recipient, such as a service provider. For example, such a transmission may be used to request a pay-per-view movie or the like. Alternatively, telecommunication information received at the distribution point 104 may be transmitted across the Internet, such as may be used in the case of sending an email message.

In certain embodiments, the ANID 107 can receive state information from a control point 128, which is shown in the illustrated embodiment as associated with distribution point 104. In certain instances, control point 128 can be software and/or hardware operated by a telecommunication service provider for controlling certain features of the operation of the ANID 107. For instance, control point 128 can instruct the ANID 107 to provide (or cease to provide) particular applications and/or telecommunication services with the application device 109 to the customer premises 116. Control point 128 can also provide other directions to the ANID 107 through the demarcation device 108, including, for instance, instructions to save or record a particular information set (e.g., data representing a movie), such that the information set may quickly (and, in some cases), repeatedly be transmitted to customer premises 116, allowing the provision of voice, data, video, etc. on demand.

Often, it may be beneficial to allow the customer to provide state information to the ANID 107. Thus, in certain embodiments, control point 128 may have a web interface, such that the customer or any authorized person, such as an employee of the telecommunication service provider or telecommunication information provider, may log onto the web interface and configure options for the ANID 107, perhaps resulting in state commands being transmitted from the distribution point 104 to the ANID 107. In other embodiments, control point 128 can be a web interface to the ANID 107 itself, allowing the customer or other authorized person to configure the ANID 107 directly. In still other embodiments, control point 128 can communicate with the ANID 107 through an application programming interface ("API"). Hence, in some embodiments, control point 128 can interface with the ANID 107 through an API.

In many such embodiments, the API corresponds to the service interface 111 of the application device. In embodiments where the service interface 111 comprises a logical interface, the API can include a set of software, hardware, or firmware routines or libraries that may be invoked programmatically to configure or relay information to the application device 109. In that sense, then, control point 128 can be understood to be a program running on a computer, perhaps located at distribution point 104 or customer premises 116, among other locations, that provides state information to the application device 109 via a software API.

In other embodiments where the service interface 111 comprises a physical interface such as those described above, the API may be accessed locally, such as by a service technician. For example, the service technician could visit property outside the customer premises 116, attach a laptop computer or other device to the physical service interface 111, and upload information to the application device 109, including perhaps both state information, as well as other telecommunication information. In still other embodiments, the application device 109 can accept state information through other means, including, for example, through a web interface by receiving a specially formatted electronic message. This is especially the case in embodiments where the application device 109 is capable of acting as a web server, as discussed below.

The addressability of the application device 109 may be used in various embodiments to change the state of the application device 109. Such state information can include any set of data or other information that may be interpreted by the application device 109 as defining operational instructions. This includes, for example, commands to process certain information sets in certain ways, e.g., to provide protocol conversion, to allow transmission of the information set, to deny transmission of the information set, to direct transmission on a particular interface, and the like, as well as commands to provide or cease providing a particular service, such as to provide access to a pay-per-view movie or an additional telephone line. Thus, in certain aspects, a telecommunication service provider can control the application services provided to a customer in several ways. First, the provider can only transmit a telecommunication information set to an ANID 107 if the user of that device is authorized to receive the application service associated with that information set. Alternatively, the service provider could send one or more application services to a customer's ANID 107, and rely on the state of the component application device 109 to prevent unauthorized access to those services.

Those skilled in the art will appreciate that certain control methods are more well-suited to certain services than to others. For instance, with respect to cable television services, the same set of information may be broadcast to many households, and the ANID 107 is well-suited to control access to those services, allowing for greater efficiency in the providing of such services. In contrast, video on demand services may instead be controlled at a distribution point 104 or elsewhere such that a particular ANID 107 only receives video-on-demand information if the customer already has requested and been authorized to receive that service. In such cases, the ANID 107 may not need to provide access control functions with respect to that service.

According to some embodiments, the ANID 107 can implement either of these access control schemes, or both in combination, as well as others. Moreover, the ANID 107 can, in some cases, be configured to support a plurality of schemes transparently. For instance, the customer could request a service from the ANID 107, perhaps using one of the methods discussed above, and the ANID 107 could relay that request to the appropriate telecommunication service provider and/or telecommunication information provider, as well as reconfigure itself to allow access to that service, if necessary. Of course, the ANID 107 can also be configured to take any necessary validating or authenticating action, such as notifying the distribution point 104 and/or control point 128 that the service has been requested, and, optionally, receiving a return confirmation that the service has been authorized.

In accordance with other embodiments, state information sent to the ANID 107 can include one or more commands to interface with a particular CPE in a certain way. For instance, state information could instruct the ANID 107 to turn on and/or off certain lights or equipment, perhaps via additional equipment, or to arm, disarm or otherwise monitor and/or configure a home security system. State information can also include operational data such as an IP address, routing information, and the like, to name but a few examples.

State information can further include instructions to modify one or more security settings of the ANID 107. Merely by way of example, in certain embodiments, the ANID 107 can include a computer virus scanner, and state information can include updated virus definitions and/or heuristics. Likewise, the ANID 107 often will be configured with access controls, such as to prevent unauthorized access through the ANID 107 by third parties. State information can include instructions on how to deal with particular third-party attempts to access the ANID 107 or internal transport medium 124. Those skilled in the art will recognize as well that some security settings may specify the level of access the customer has to the functions of the ANID 107, such as to prevent unauthorized use of certain telecommunication services, and that these settings also may be modified by received state information.

There are a variety of ways in which the various access-control and security functionalities of the ANID 107 discussed above may be implemented. In different embodiments, these functionalities may be performed by the demarcation device 108, by the application device 109, by a combination of the demarcation and application devices 108 and 109, and/or by still other components that may additionally be comprised by the ANID 107. Moreover, the state information that manages such functionalities may sometimes be sent periodically to the ANID 107 to ensure that it is current. Those skilled in the art will also recognize that state information can be considered a subset of the broader category of telecommunication information.

Figure 1B:
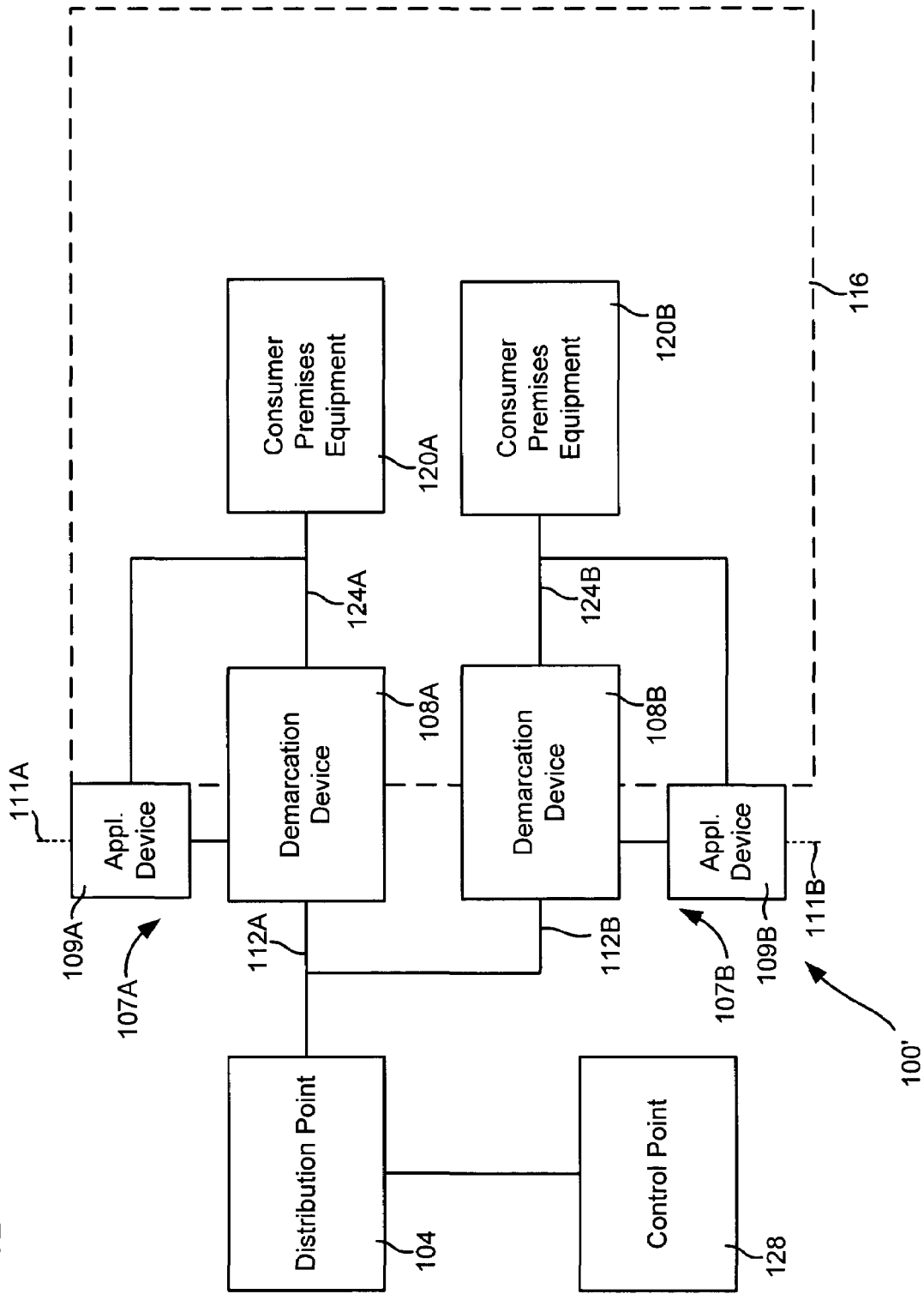

Turning now to FIG. 1B, configuration 100' is illustrative of certain embodiments that can provide multiple ANIDs 107 at customer premises 116. A first ANID 107A comprises demarcation device 108A and application device 109A, and a second ANID 107B comprises demarcation device 108B and application device 109B. In this illustration, the application devices 109 are shown as separated from the demarcation devices 108, although one or more of the multiple ANIDs 107 may alternatively comprise structures in which they are integrated. In instances where the ANIDs 107 have separated demarcation-and application-device components, the separate components may both be affixed to an exterior wall of the customer premises 116. This has the same advantages discussed previously in connection with integrated ANIDs, namely ease of upgrading or otherwise changing the network by a telecommunication service provider. In other instances, the separate components may be provided in different locations, such as by providing the demarcation device 108 at a facility operated by the telecommunication service provider while keeping the application device 109 on the exterior wall of the customer premises 116.

Similar to the configuration of FIG. 1A, appliance device 109A may be in communication with CPE 120A through internal transport medium 124A and appliance device 109B may be in communication with CPE 120B through internal transport medium 124B. Implementation of the applications provided by application devices 109A and 109B can thus be achieved respectively with telecommunication information received and transmitted by demarcation devices 108A and 108B. In addition, demarcation device 108A can be in direct communication with CPE 120A through internal transport medium 124A, and demarcation device 108B can likewise be in direct communication with CPE 120B through internal transport medium 124B. Each of the ANIDs 107 may be provided in communication with a common distribution point 104 through their respective demarcation devices 108. In particular, demarcation device 108B can communicate with distribution point 104 through external transport medium 112B which, as illustrated by FIG. 1B, can simply be spliced into external transport medium 112A, such as by using an active or passive splitting device, which could be optical, as in a fiber environment, or electrical. If desired, demarcation devices 108 and/or distribution point 104 can include control logic to prevent unauthorized access by demarcation device 108A to telecommunication information sent to or received from demarcation device 108B, and vice versa. In other embodiments, external transport medium 112B could run directly from demarcation device 108B to distribution point 104. In still other embodiments, external transport medium 112B could be omitted, with demarcation device 108B coupled to demarcation device 108A, which could then provide connectivity between demarcation device 108B and distribution point 104 through external transport medium 112A.

Configuration 100' can be used in a variety of implementations. For instance, if customer premises 116 is a multiple-dwelling unit ("MDU"), separate ANIDs 107 can be provided for each separate resident or family. Alternatively, a single demarcation device, perhaps with more interfaces, can service multiple dwelling or business units. In such implementations, especially when external transport medium 112B does not directly couple demarcation device 108B to distribution point 104, demarcation devices 108A, 108B can include security functionality, for example to prevent telecommunication signals intended for CPE 120A from reaching CPE 120B and vice versa. In some embodiments, demarcation devices 108 can provide a variety of such security, encryption, and authentication functions.

Figure 2A:
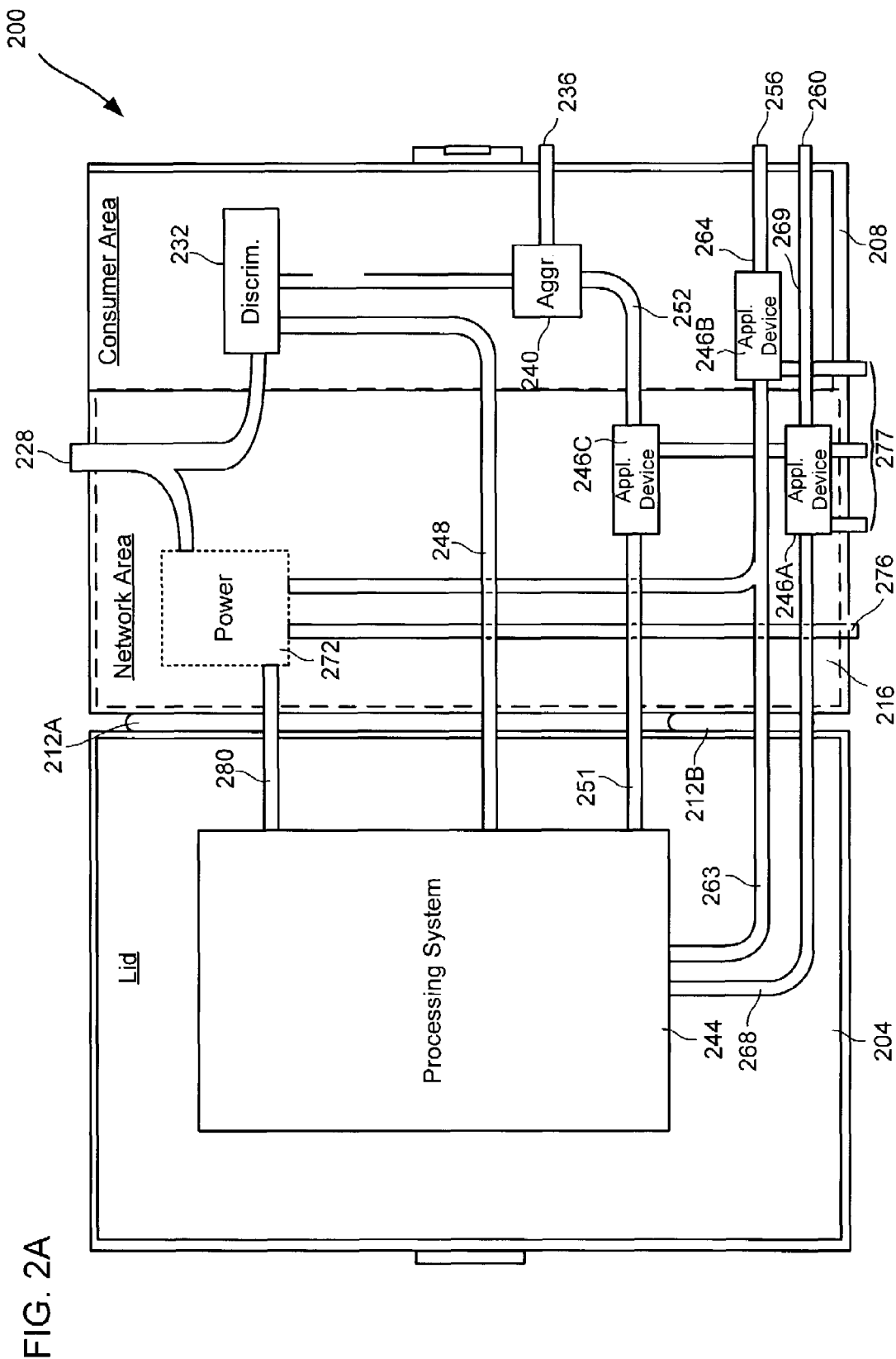

The description above provides a specific example of a more general class of embodiments in which multiple ANIDs 107 are daisy-chained together, using any of the telecommunication media discussed herein. This allows a telecommunication service provider to provide service to additional customers without requiring any additional external transport media. Similarly, ANIDs 107 at multiple premises can be coupled together, such that if the external transport medium coupled to one of the ANIDs 107 fails, that device can maintain connectivity to the distribution point through its connection to another ANID 107. An ANID 107 in accordance with specific embodiments thus may have an interface for securely connecting to one or more additional ANIDs 107, and thus forming a mesh network of ANIDs and/or distribution points. This allows a particular ANID 107 to serve as a conduit between another interface device and a distribution point without allowing any unauthorized reception of telecommunication information intended for the connected interface device. This secure interface can be included, for instance, in a portion of the ANID 107 that is inaccessible to customers, as illustrated in FIG. 2A and described below.

Figure 1C:
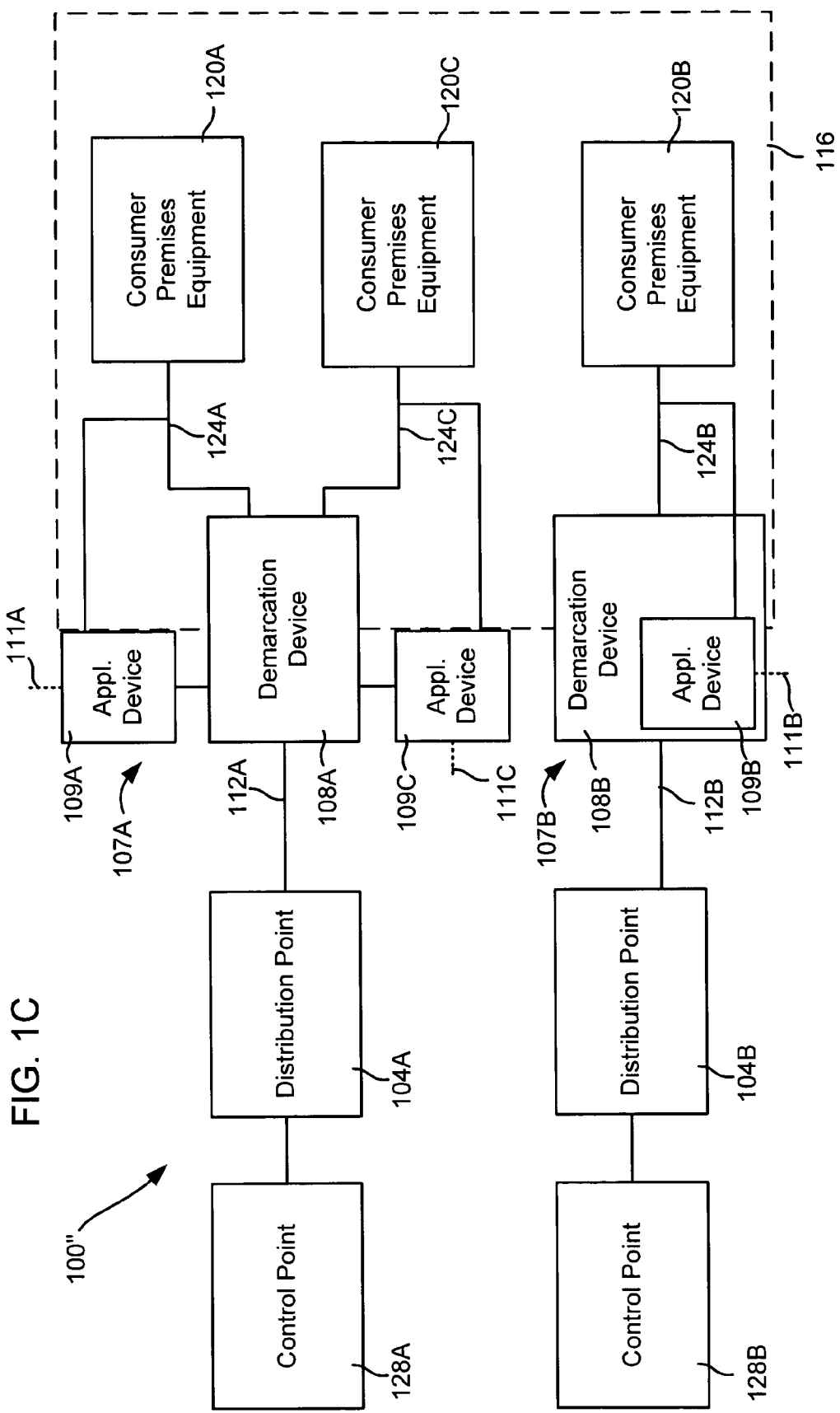

In other embodiments, a single customer premises 116 might have connections to a plurality of telecommunication service providers. For example, turning now to FIG. 1C, configuration 100" includes a distribution point 104A coupled to a first ANID 107A via external transport medium 112A and also includes a second distribution point 104B coupled to a second ANID 107B via external transport medium 112B. Merely by way of example, distribution point 104B could, for example, be associated with a cable television provider, while distribution point 104A could be associated with a telephone company. In addition, configuration 100" illustrates that multiple CPE 120A and 120C may be coupled with a single ANID 107A. This may be done with multiple internal transport media 124A and 124C as illustrated by FIG. 1C, or may alternatively be done through a common internal transport medium as discussed below. Thus, for example, CPE 120A could be a telephone, CPE 120C could be a fax machine, and CPE 120B could be a television.

FIG. 1C further provides an example of combinations of different configurations for the ANIDs 107. In particular, the second ANID 107B, connected with distribution point 104B, is shown having an integrated demarcation device 108B and application device 109B, with service interface 111B. The first ANID 107A, connected with distribution point 104A, is instead shown having separated demarcation and application devices. Moreover, the first ANID 107A illustrates an ANID that may have a plurality of application devices 109A and 109C in communication with a single demarcation device 108A. Each of these application devices 109A may have a respective service interface 111A and 111C, and may be connected with different internal transport media 124A or 124C to reflect the different application capabilities. Thus, for example, application device 109A could provide an application intended for telephone functions, such as caller identification or call waiting, and application device 109C could provide an application intended for fax functions, such as a storage and retrieval facility. The application device 109B comprised by the second ANID 107B could provide an application intended for cable-TV functions, such as a digital recorder function.

Figure 1D:
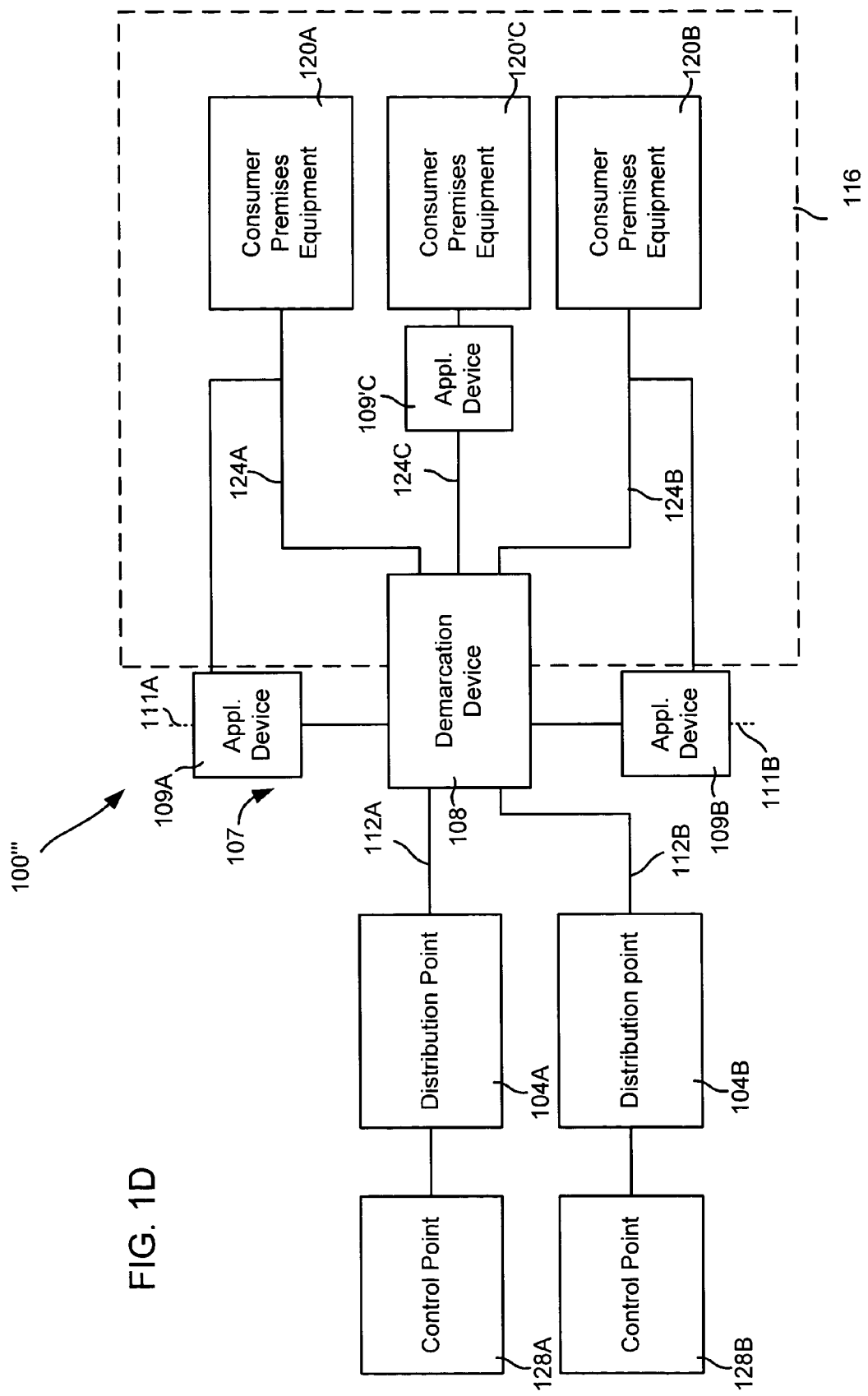

In another alternative embodiment, such as configuration 100''' illustrated in FIG. 1D, an ANID 107 can provide connectivity to a plurality of distribution points 104A and 104B, as well to a plurality of CPE 120A, 120B, and 120C. In the illustrated configuration 100''', the ANID 107 is provided in a separated form with three application devices. Two of the application devices 109A and 109B are provided external to the customer premises 116 and have service interfaces 11A and 11B. The third application interface 109C is provide interior to the customer premises, illustrating that it is not a requirement that all of the application devices 109 comprised by the ANID 107 be disposed external to the customer premises. The connectivity of a single ANID 107 to a plurality of distribution points 104A and 104B and to a plurality of CPE 120A, 120B, and 120C may be effected through attachments for multiple internal transport media 124A, 124B, and 124C and for multiple external transport media 112A and 112B. Moreover, as illustrated by FIG. 1D, each distribution point 104A and 104B may be associated with a different control point 128A and 128B, respectively. In alternative embodiments, a single control point 128 could provide configuration information to the ANID 107 with respect to both distribution points 104A and 104B.

Figure 1E:
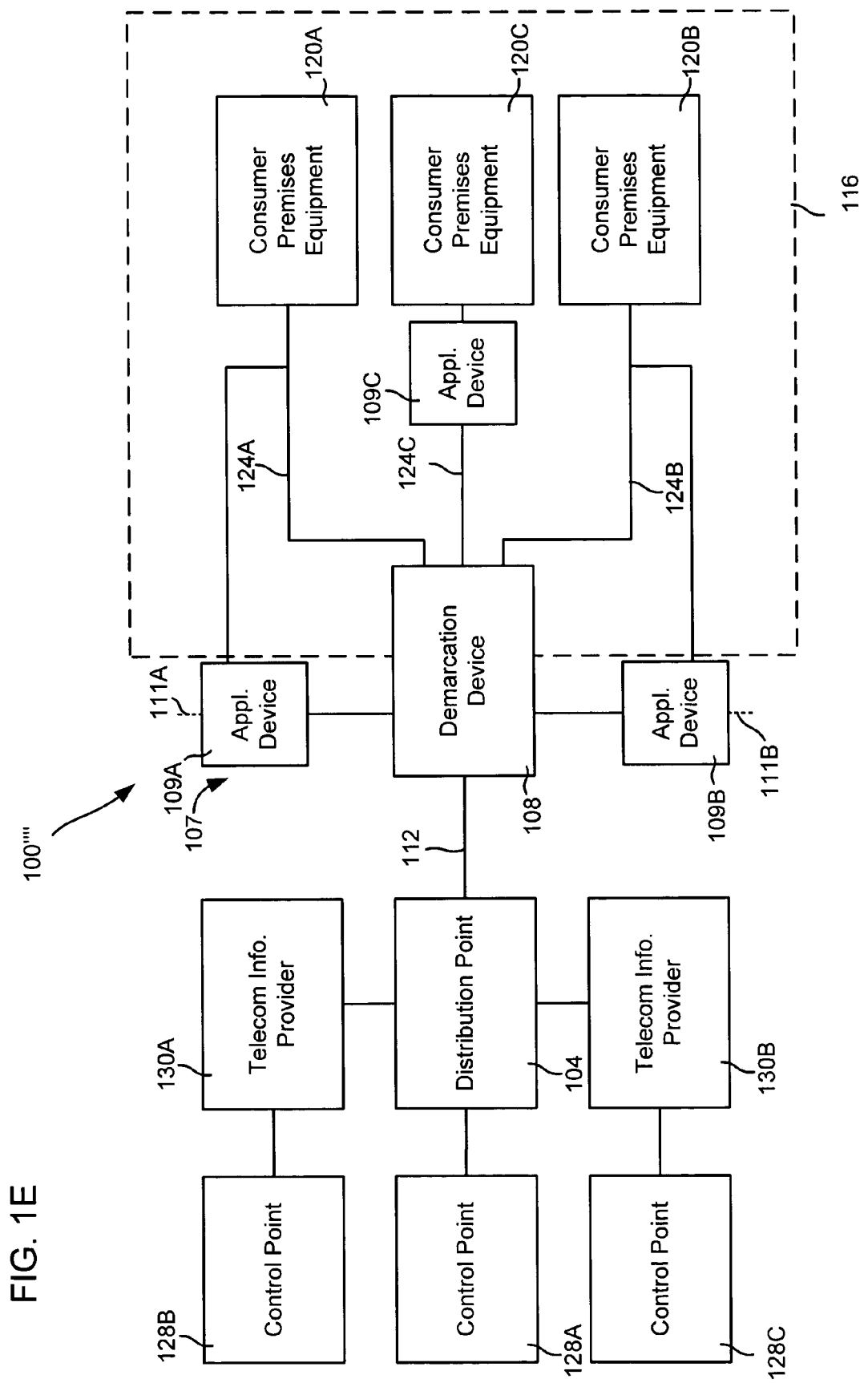

Turning now to FIG. 1E, another exemplary configuration 100"" is presented in accordance with certain embodiments of the invention. In exemplary system 100"" the ANID 107 is shown having a configuration similar to that of FIG. 1D, with a structure in which the demarcation- and application-device components are separated, including one of the application devices 109C in the interior of the customer premises 116.

Instead of communication of the ANID 107 with a plurality of control points 128 being effected through a plurality of distribution points 104, FIG. 1E shows an embodiment in which such communication is achieved with a common distribution point 104. This distribution point 104, which may be operated by a telecommunication service provider, can be in communication with one or more telecommunication information providers 130A and 130B. Each telecommunication information provider 130A and 130B can be the source or recipient of one or more telecommunication information sets, each of which may be associated with a particular telecommunication service. Each of the telecommunication information sets may thus be transmitted to, or received from, the distribution point 104. Distribution point 104 can also transmit these information sets to, or received them from, the ANID 107 through demarcation device 108, via external transport medium 112. Such an configuration 100"" thus exploits a capability of the ANID 107 to process a plurality of such information sets in a variety of ways, as discussed below.

In certain embodiments, each telecommunication information provider 130A or 130B may have an individual control point 128B or 128C. In some such embodiments, control points 128B and 128C can be in communication with the ANID 107 via distribution point 104 or, alternatively, could have a separate means of communication with the ANID 107, such as via a modem and telephone line. Thus, in some embodiments, the ANID 107 can receive state information from each control point 128B, and 128C through the demarcation device 108. As discussed above, state information can direct the behavior of the demarcation device 108 and/or application devices 109 comprised by the ANID 107, in particular with respect to how to handle telecommunication information to implement various applications on the CPE 120A, 120B, and/or 120C. Such state information may be received by the ANID 107 over the external transport medium 112 or through the service interfaces 111A and 111B of the application devices 109A and 109B. In some embodiments, the ANID 107 can be configured to accept state information related only to the telecommunication information and/or services provided by the telecommunication information provider sending the state information. In this way, the ANID 107 can be protected against inadvertent or malicious misconfiguration, which could interrupt a telecommunication service provided by another telecommunication information provider. Likewise, the ANID 107 could be configured to automatically request updated state information from control point 128A associated with distribution point 104 in the case of misconfiguration, and control point 128A could maintain a master set of configuration information to be able to accommodate such a request.

In other embodiments, telecommunication information providers 130A and 130B may not have an associated control point. In such embodiments, telecommunication information providers 130A and 130B can send state information to control point 128A, perhaps via distribution point 104A, and control point 128A can relay that state information to the demarcation device 108 (again, perhaps through distribution point 104). In this way the telecommunication service provider can control which state information is transmitted to the ANID 107.

In certain embodiments, the demarcation device 108 can submit a request for state information to one or more control points 128A, 128B, and/or 128C, perhaps via distribution point 104. Such a request might be made if, for instance, the customer would like to watch a pay-per-view movie. The appropriate control point, e.g., 128B, could then provide the proper state information to the ANID 107 as described above, allowing transmission of the movie to customer premises 116.

Figure 1F:
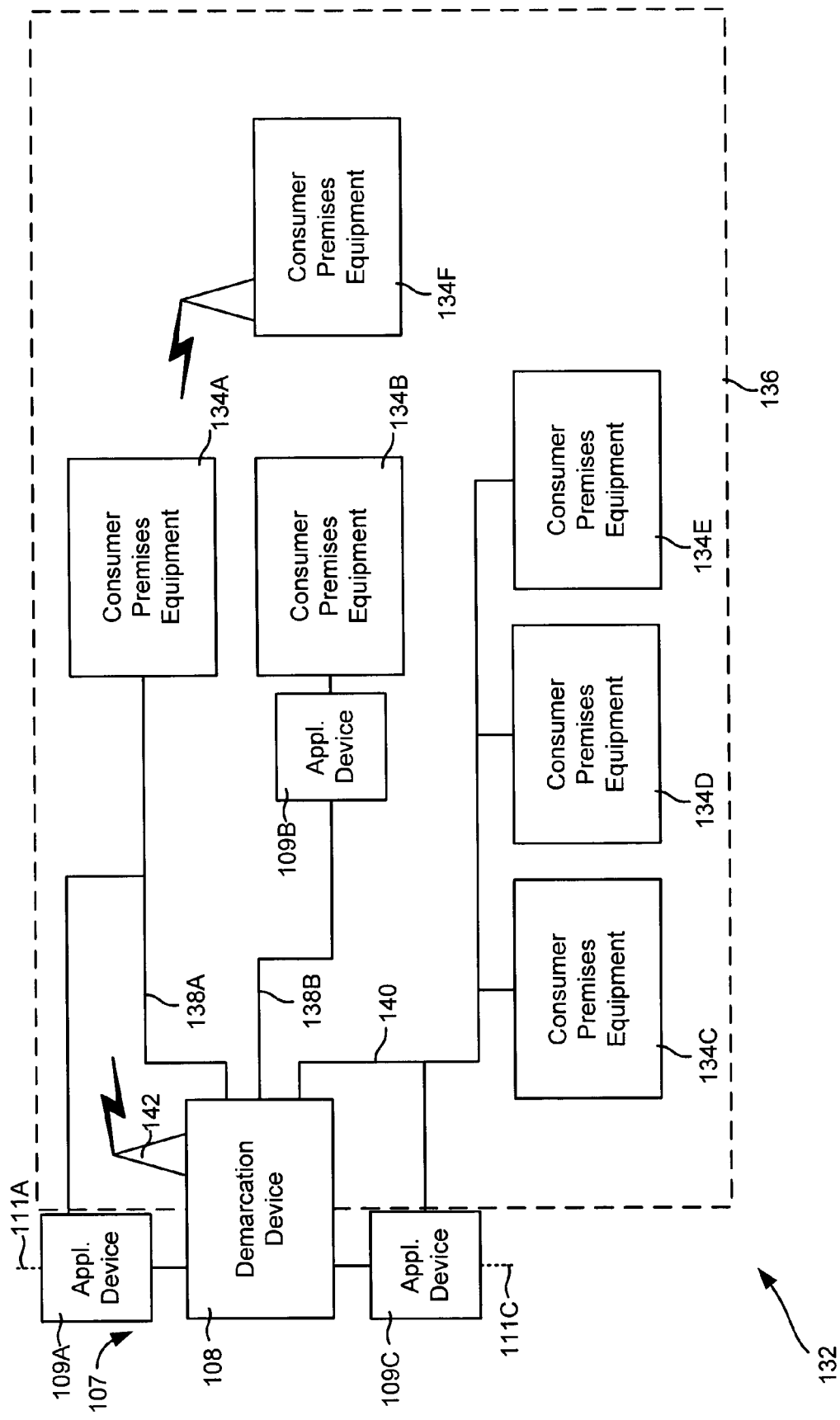

As exemplified by configuration 132 in FIG. 1F, embodiments of the invention enable a single ANID 107 to serve multiple CPE 134A-F, each of which can comprise a different appliance, at a single customer premises 136. For instance, CPE 134A can be a computer with an Ethernet interface, CPE 134B can be a telephone, CPE 134C can be a video game system, CPE 134D can be a set-top box attached to a television, CPE 134E can be a computer with an HPNA interface, and CPE 134F can be a laptop computer equipped with a wireless network card.

Also as illustrated by configuration 132, the single ANID 107 can support multiple network topologies. For instance, the ANID 107 can serve as a hub for a point-to-point network topology, with multiple point-to-point connections to CPE 134A and 134B via internal transport media 138A and 138B, respectively. In addition, the ANID 107 can support a bus topology, as illustrated by internal transport medium 140, which can connect the ANID 107 to CPE 134C, 134D and 134E. The ANID 107 can also be equipped with a wireless transmitter 142 for communication with wireless-capable CPE 134F. In this way, the ANID 107 can support a wide variety of networking media in customer premises 136, including the existing telephone, satellite, cable, and network wiring. For instance, the existing telephone wiring in most homes is arranged in a bus topology, as is most coaxial cable (for instance RG6 or RG59) installed by cable television providers, although each may, in some implementations, be wired using a star topology. In contrast, many homes also have 10Base-T Ethernet networks, which sometimes require a central hub. As used herein, the term "10Base-T" can be understood to include newer implementations of Ethernet over unshielded twisted pair wiring, including, for instance, 100 megabit Ethernet (100Base-T, 100VG-AnyLAN, etc.) and gigabit Ethernet (1000Base-T) standards. The ANID 107 can support these and other network topologies, serving as the hub in a 10Base-T network if necessary.

Figure 1G:
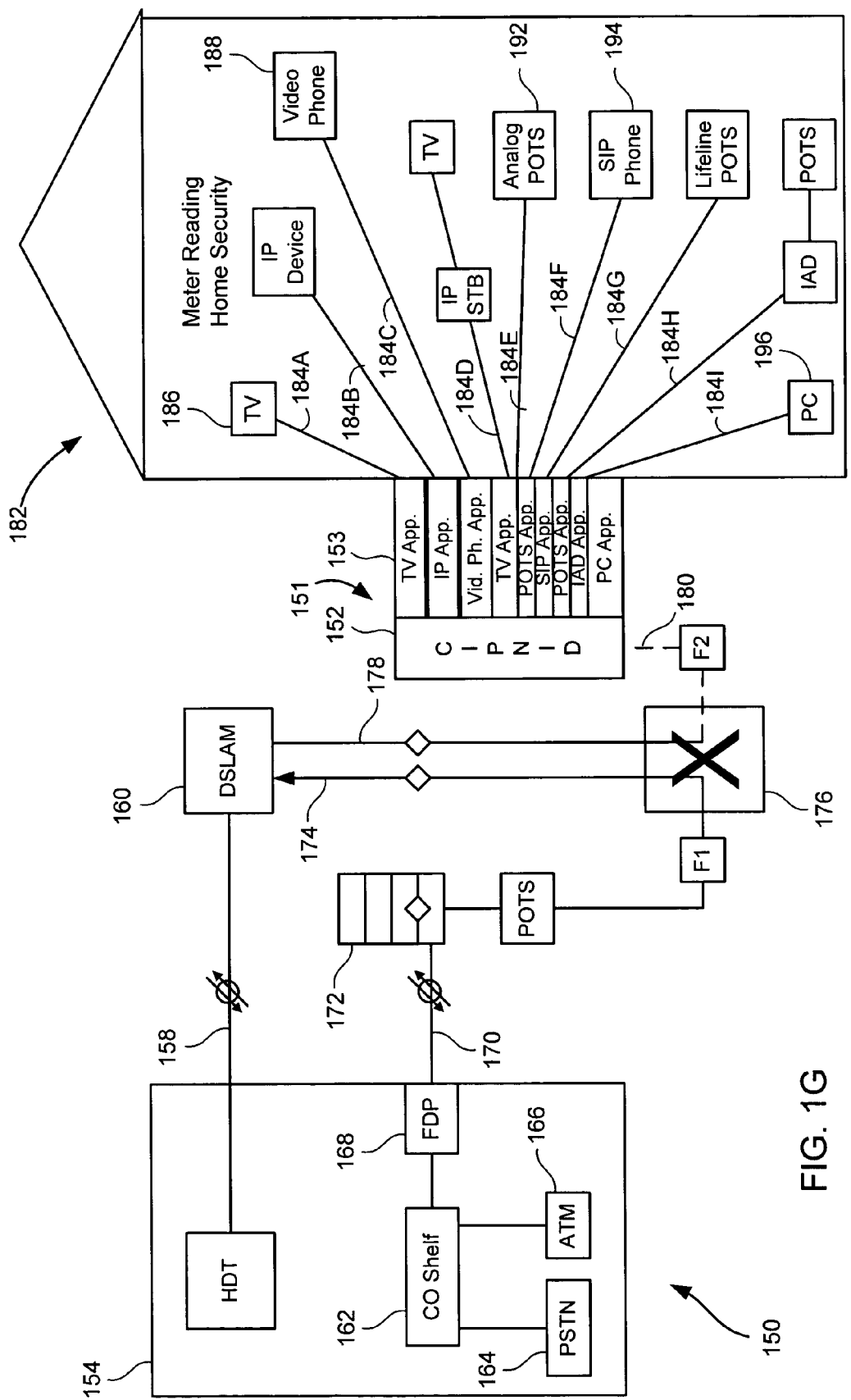

FIG. 1G illustrates another exemplary configuration 150 for using an ANID 151 in an xDSL implementation, according to certain embodiments of the invention. In some embodiments, distribution point 154 can comprise a host digital terminal 156 coupled by transport medium 158 to DSLAM 160. As noted above, however, in other embodiments, DSLAM 160 can be considered the distribution point. Host digital terminal 156 can be coupled to any of a variety of data sources and/or recipients, either directly, or indirectly, such as through the provider's network and/or the Internet. In the illustrated embodiment, transport medium 158 can be a Synchronous Optical NETwork ("SONET") link (e.g., OC-3, OC-12, etc.), although those skilled in the art will recognize that other suitable transport media may be substituted.

In accordance with some embodiments, distribution point 154 also comprises a central office shelf 162 in communication with the PSTN 164, as well with an asynchronous transfer mode ("ATM") network 166, either of which can provide connectivity to any of the variety of data sources and/or recipients discussed above. In certain embodiments, shelf 162 is, in turn, coupled to fiber distribution panel 168, which is connected by transport medium 170 to a digital loop carrier remote termination cabinet 172. Remote termination cabinet 172 can also be coupled to DSLAM 160 by transport medium 174, which may be routed through serving area interface 176. In effect, transport medium 174 can carry one or more POTS information sets, and transport medium 158 can carry one or more non-POTS (in this case xDSL) information sets.

As illustrated, these two information sets can be combined at DSLAM 160, which is in communication with serving area interface 176 through transport medium 178. Serving area interface 176 can be coupled to demarcation device 152 of ANID 151 with transport medium 180. In addition to the demarcation device 152, the ANID 151 comprises a plurality of application devices 153 adapted to provide applications to various equipment within the customer premises 182. In the illustrated embodiment, the ANID 151 is fixedly attached to an exterior wall at the customer premises 182. The application devices 153 of the ANID 151 may then be coupled via one or more internal transport media 184A-I to a variety of CPE, including without limitation a television set 186, a video phone 188, an IP-compatible set-top box 190, an analog (POTS) telephone 192, an IP-compatible phone 194, and a personal computer 196. In this way, an ANID 151 can be used to provide a plurality of telecommunication services to a customer premises.

2. Structure of an Application Network Interface Device

Figure 2B:
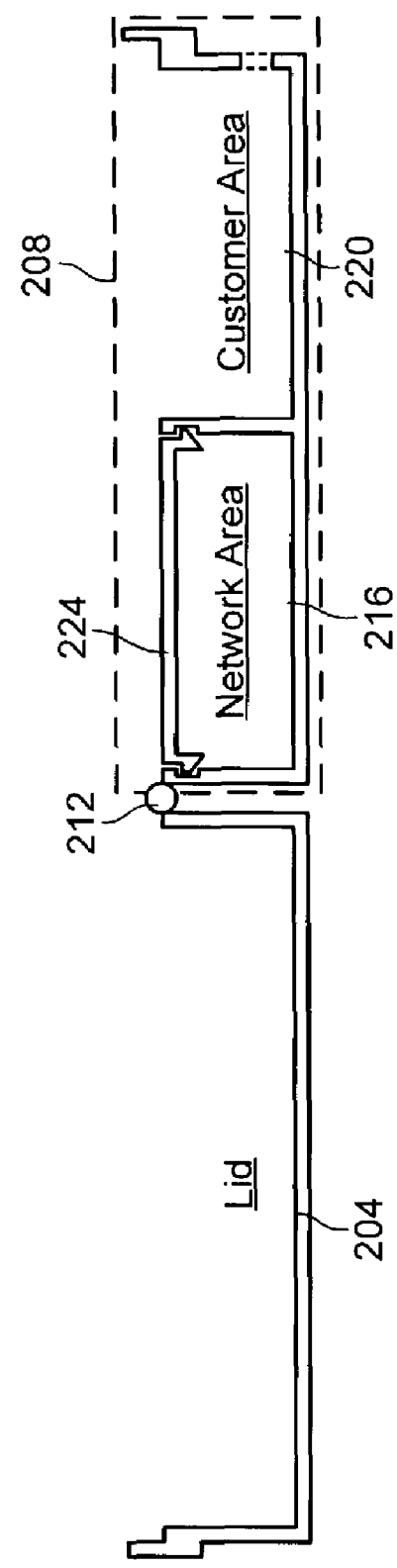

One exemplary embodiment of an ANID 200 is illustrated in FIGS. 2A and 2B. For purposes of illustration, FIG. 2A provides a top view that explicitly shows components within the ANID 200, while FIG. 2B provides a side view that shows the logical organization of the ANID 200 without the components. In the illustrated embodiment, ANID 200 comprises a clamshell design, with a lid portion 204 and a body portion 208 connected by hinges 212A and 212B. The body portion 208 comprises a network area 216 and a customer area 220. Generally, network area 216 is adapted to receive a cover and is designed generally to be accessible only to personnel authorized by the telecommunication service provider. In contrast, when ANID 200 is open, the customer can access customer area 220 to add or remove components as desired. In this and other ways, the ANID 200 serves to isolate the telecommunication service provider's network from the customer's network, as described above.

The ANID 200 can include a first interface 228 for communicating with the provider's external transport medium. Those skilled in the art will recognize that, in some embodiments, as described above, the external transport medium may comprise the twisted-pair copper "local loop" running from the customer's premises to the telecommunication service provider's local office, and interface 228 will allow for the attachment of the local loop to the ANID 200. As discussed above, in other embodiments, the external transport medium can be any of a variety of other media, including satellite transmissions, wireless transmissions, coaxial cable. In fact, in certain embodiments, the external transport medium can comprise multiple transport media (of the same or different types), for which the ANID 200 could include multiple interfaces. In some such embodiments, the ANID 200 can function to couple a plurality of external transport media to one another, seamlessly increasing the bandwidth available to the customer premises. For instance, a customer premises might have a satellite link to one telecommunication service provider and an ADSL link to another provider, and the ANID 200 could combine or multiplex these two links to provide an apparent single, higher-bandwidth to the customer premises. Similarly, those skilled in the art will recognize that in certain of these embodiments, a particular external transport medium, such as a satellite link, may be more well-suited to one way transmission of telecommunication information; in such cases, the ANID 200 could use a second external transport medium, such as an ADSL link, to allow transmission in the other direction.

Interface 228 can be coupled to a discrimination device 232, which can be operative to separate information sets received on interface 228, and, conversely, aggregate information sets for transmission on interface 22). Merely by way of example, in particular embodiments, discrimination device 232 can separate POTS information from other telecommunication information and/or isolate signals on the internal transport medium from the external transport medium and vice versa. In some embodiments, for instance xDSL implementations, discrimination device 232 can comprise one or more filters. Such filters can include, but are not limited to, high-pass, low-pass, and/or band-pass filters. For instance, in an xDSL implementation, discrimination device 232 might include a high-pass and/or low-pass filter for separating high-frequency (e.g., data) from low frequency (e.g., POTS) information. In other embodiments, discrimination device 232 can comprise many other types of filters, including both digital and analog filters. Discrimination device 232 can be operable to separate information sets through a variety of criteria, including for example, by frequency, by destination device, information type, and/or frequency. Further, in certain embodiments, information sets can be multiplexed (for instance, using various time-division multiplexing or wave-division multiplexing schemes known in the art) for transmission over an external transport medium, and discrimination device 232 can comprise a demultiplexer capable of separating multiplexed signals and, optionally, routing each signal to the necessary destination.

In the illustrated embodiment, discrimination device 232 is in communication with a second interface 236, which can interface with the telephone wires at the customer premises to provide traditional analog telephone service. In some embodiments, an aggregator 240 can be situated between discrimination device 232 and interface 236 to allow additional, perhaps non-POTS, information sets to be sent and received through interface 236 simultaneously with the POTS information. This can include, for example, aggregating information sets for transmission of an HPNA signal over an internal transport medium.

The discrimination device can also be coupled to a processing system 244, which in the illustrated embodiment is located in the lid portion 204, and all non-POTS information sets can be routed to processing system 244 for additional processing. Processing system 244 is described in detail below, but can, in general, comprise one or microprocessors, including digital signal processor ("DSP") chips, memory devices, including both volatile and nonvolatile memories, and storage devices, including hard disk drives, optical drives and other media. In fact, processing system 244 can comprise the equivalent of one or more personal computers, running any of a variety of operating systems, including variants of Microsoft's Windows™ operating system, as well as various flavors of the UNIX™ operating system, including open source implementations such as the several Linux™ and FreeBSD™ operating systems.

Telecommunication information or information sets can be processed by processing system 244 in a variety of ways, including, for example, routing a given information set to a particular interface, transforming information such as by encoding and/or decoding information and converting between different transport protocols, storing information, filtering information, and any of the other functions described herein with respect to processing systems. In certain embodiments, processing system 244 can serve as the termination point for an external transport medium; for instance processing system 244 can incorporate the functionality of an xDSL modem. In other embodiments, processing system 244 can serve to identify quality-of-service requirements (for instance, latency requirements for voice transmissions and bandwidth requirements for streaming media transmissions, to name a few) and enforce those requirements, ensuring that sufficient bandwidth is provided to a particular device, network segment or application to maintain the quality of service required.

In certain embodiments, such as those described above with respect to FIG. 1D, an ANID may comprise another interface in communication with a second distribution point 104B through an additional external transport medium 112A, perhaps operated by a different telecommunication service provider. In such a case, the additional external interface could be coupled to discrimination device 232, or it could be coupled to another discrimination device, which could also be in communication with processing system 244, interface 236 and/or aggregator 240. Thus, certain embodiments allow a single ANID to serve as a communication gateway between the customer premises and multiple telecommunication service providers, including combining or multiplexing multiple external transport media (each of which may be in communication with a different telecommunication service provider and/or telecommunication information provider) as discussed above.

In the illustrated example, processing system 244 is in communication with aggregator 240, which, as discussed above, can aggregate non-POTS information sets received from processing system 244 and POTS information sets received directly from discrimination device 232 for consolidated transmission via interface 236. In effect, discrimination device 232 and aggregator 240, perhaps in conjunction with processing system 244, can function to separate telecommunication information received on interface 228 into a set of POTS telecommunication information and a set of non-POTS telecommunication information. POTS information can be understood to include ordinary telephone signals, and non-POTS information can be understood to include all other telecommunication information). The non-POTS information is routed via transport medium 248 to processing system 244 for processing, and the POTS information is routed to interface 236 for transmission to the internal transport medium. In certain embodiments, one or more sets of non-POTS information can be routed to interface 236 using transport medium 252 for transmission through interface 236, perhaps in combination with one or more sets of POTS information.

Of course, discrimination device 232 and aggregator 240 can perform the same function in reverse, i.e., to separate and recombine different sets of telecommunication information received on interface 236 from the customer's premises. Thus, in some embodiments, both discrimination device 232 and aggregator 240 each can perform a combined discrimination-device-aggregator function, depending on the direction of information flow. In fact, while termed "discrimination device" and "aggregator" for ease of description, those two devices can actually be identical, and further, their functionality can, in some embodiments, be incorporated into a single device, which could be coupled to interface 228, interface 236, and processing system 244, and could route information sets among any of those three components as necessary. Moreover, as described below, the functionality of discrimination device 232 and/or aggregator 240 can be incorporated into processing system 244; likewise discrimination device 232 can incorporate interface 228 and/or aggregator 240 can incorporate interface 236, such that discrimination device 232 and/or aggregator 240 comprise the necessary components to be coupled directly to the external and internal transport media, respectively.

Discrimination device 232 and/or aggregator 240 can also serve another function in certain embodiments: Since the external transport medium is coupled to first interface 228 and the internal transport medium can be coupled to, inter alia, second interface 236, the discrimination device 232 and/or aggregator 240 can serve as an isolation device for intermediating between the two media, such that when a topological change occurs in one of the media, only the ANID interface need be changed, and the other transport medium is not affected. In some such embodiments, discrimination device 232 and/or aggregator 240 can serve to intermediate (including protocol translation and the like) between interfaces 232, 240, allowing either the internal or the external transport medium to be upgraded or changed without impacting the other transport medium. Of course, in certain embodiments, this isolation function also could be performed by processing system 244. In yet other embodiments, the isolation device might comprise a separate piece of hardware in communication with discrimination device 232, aggregator 240 and/or processing system 244.

The ANID 200 may also comprise one or more application devices 246, which are usually disposed in the network area 216. The application devices are generally provided in communication with the processing system 244 by transport media 251, 263, and/or 268. In some instances, such as illustrated with application devices 246A and 246B, the application devices may be in communication with interfaces 256 and 260 that allow communication with transport media internal to the customer premises, such as over transport media 264 and 269. For example, interface 256 could be a coaxial interface for connection to RG6 and/or RG59 cable, and interface 260 could be an RJ45 and/or RJ11 interface for connection to unshielded twisted pair cable, which can, for instance, form a 10Base-T Ethernet network.

In other instances, such as illustrated with application device 246C, information might be routed from the application device 246C through the aggregator. Such an application may be suitable for applications that use IP data, such as a VoIP application. For example, the ANID 200 might receive IP data, perhaps combined with other types of telecommunication information, on interface 228. The information set comprising the IP data can be routed by the discrimination device 232 via medium 248 to processing system 244, where it can be processed. Depending on the embodiment, it could then be routed via transport medium 251 to VoIP application device 246C and then provided to the customer's existing telephone wiring using interface 236, optionally in conjunction with aggregator 240 and/or one or more line drivers. It could alternatively be routed to any of the other application devices 246A or 246B depending on their functionality. In this way, the ANID can allow virtually unlimited connectivity options for each CPE at the customer premises. Adding to the flexibility of ANID 200, the processing system 244 could include components to serve, for example, as a cable or xDSL modem, as well as components to serve as an Ethernet hub, switch, router, or gateway, the functions of each of which are familiar to those of skill in the art.

Furthermore, the application devices 246 may be provided generally within the network area 216 or in the consumer area 208, or with some in the network area 216 and others in the consumer area 208, depending on the embodiment. This is illustrated in FIG. 2A by showing application devices 246A and 246C disposed within the network area 216 of the ANID 200 and application device 246B disposed within the consumer area 208 of the ANID 200.

There are a variety of different application devices 246 that be incorporated within the ANID 200 in order to provide a versatile range of functionality. The following examples are provided merely by way of illustration and still other application devices that may additionally or alternatively be used will be evident to those of skill in the art after reading this description. One application device 246 that may be included is a digital-recorder application device, which could provide a mechanism for digital recording of all forms of information incoming to the ANID 200 and make them accessible to a user at the customer premises. The information that could be recorded includes video, data, voice, among other types of information. Another application device 246 that may be included is a digital storage application device, which could provide a supplementary mechanism for storing information presented to user applications. The information that could be stored also includes video, data, voice, and other types of information. The combination of the digital-recorder application device and digital-storage application device in an ANID 200 may be used conveniently to provide primary and secondary information-storage capabilities. For example, the digital-recorder application could be used to provide a primary, on-line, video storage capability while the digital-storage application could be used to provide a secondary, off-line, video storage capability. Still other application devices could be included to enhance such functionality further. For example, hard-drive application device could be provided to permit expandable storage capabilities.

Other examples of application devices 246 whose functions may be conveniently coordinated include digital-asset application devices. For example, one of the application devices 246 in the ANID 200 could comprise a digital-asset sharing application device to permit sharing of information among equipment within the customer premises. Such an asset-sharing capability may be used within the customer premises to share video, data, electronic books, games, music, and the like. Another of the application devices 246 could comprise a digital-asset caching application device to permit storage and distribution of digital assets. The combination of digital-asset sharing application devices and digital-asset caching application devices among a plurality of ANIDs 200 in a service are could then be used to permit exchange of video, data, electronic books, games, music, and the like among customer premises throughout a defined service area. In some instances, a further application device 246 could comprise a digital-asset protection application device to control the distribution of digital assets in accordance with legal restrictions, such as those derived from copyright ownership.

In some embodiments, the application devices 246 may comprise application devices for effecting various voice-related applications within a customer premises. For example, a voice application device could include functionality to provide such functions as telephone caller identification, call logs, voice mail-storage, voice-mail retrieval, call waiting, solicitation barriers, and the like. In addition, a VoIP application device could provide support for VoIP functions within the customer premises.

Still other application devices 246 that may be used include various types of informational applications. For example, an online digital guide application device could be used to provide a digital data guide for television, music, and other types of programming. Such a data guide could be provided alternatively in real time or in non-real-time. A further example of an informational application could be realized with a home-utilities application device adapted to provide monitoring and/or billing tracking functions for utilities used within the customer premises. In this way, the use and/or cost of electricity, gas, water, and other utilities may be monitored by the customer. In addition, a diagnostic-interface application device may be provided to permit diagnostic functions of equipment within the customer premises, thereby permitting the customer to obtain information on the functioning of such equipment.

Other application devices 246 may provide security functions. For example, a data security application device may be used to provide hacker protection for the home, responding to identified attempts to breach the security of the customer premises. In addition, a home-security application device could be provided to monitor the physical security of the customer premises. Such a home-security application device would typically be provided with an interface to door and window monitors to determine whether they are open or shut, and with an interface to motion detectors, glass-breaking detectors, and other physical security equipment known to those of skill in the art.

Application devices 246 may also be provided to permit various types of data-conversion functions to be used by the customer premises. For example, a digital-information-conversion application device may be provided to convert digital information incoming to the ANID 200 to be converted to other sources for use by CPE in the customer premises. Thus, incoming digital information could be converted to analog information for use by analog equipment, such as an analog television. Similarly, incoming broadcast video could be converted for transmission to a PDA, and the like. Similarly, a wireless application device could be used to provide a wireless interface to the customer premises for data, video, and other types of information. Merely by way of example, if interface 228 receives telecommunication information that includes digitally encoded video signals, such as MPEG-2 data, the information set that includes the encoded video signals can be routed by discrimination device 232 to processing system 244. After transmission from the processing system to the information-conversion application device over transport medium 263, the signals can be decoded into RF-modulated NTSC, HDTV, PAL and/or SECAM format for transmission via transport medium 264 to coaxial interface 256, where it can be transmitted via coaxial cable to one or more televisions at the customer premises. Alternatively, if the customer has a digital set-top box located at the television, the encoded signals can be routed by to aggregator 240, where the signals can be transferred through interface 236 to the set-top box for decoding. The ability of the ANID 200 to support multiple interfaces of different types thus allows great flexibility in routing telecommunication information throughout the customer premises.

Each of the application devices 246 in the ANID may include a service interface 277 to permit states of the application devices 246 to be changed and/or updated. As previously notes, such interfaces may comprise physical interfaces such as USB, FireWire (IEEE 1394), RJ-11, RJ-45, serial, coaxial, or other physical interfaces, to permit a service technician to interact with the application devices 246 while at the site of the ANID 200. Alternatively, the service interfaces may comprise logical interfaces to permit IP addressing to be used in changing the state of the application devices. In many instances, the ANID 200 may also include a future-application device with open architecture to support new applications. The architecture may be configured by use of the service interfaces 277 when the new application is implemented.

In certain embodiments, ANID 200 can comprise a line driver (not shown on FIG. 2A or 2B), coupled to processing system 244 and aggregator 240. The line driver can function to allow conversion between various network formats and media, allowing a variety of different media types, e.g., twisted pair and/or coaxial cable, in accordance with the HPNA and HPNA+standards, as well, perhaps, as the customer premises' A/C wiring, in accordance, for example, with the HomePlug™ standard, to transport combined POTS and non-POTS information sets.

In certain embodiments, ANID 200 can comprise a power supply 272 for providing electrical power to the components in ANID 200. Power supply 272 can be powered through electrical current carried on the external transport medium and received on interface 228. Alternatively, power supply can receive electrical current from a coaxial interface, such as interface 256, or through a dedicated transformer plugged into an AC outlet at customer premises, e.g., through 12V connection 276. Processing system 244 can be powered by a connection 280 to power supply 272, or through one or more separate power sources, including perhaps the A/C power of the customer premises. In some embodiments, processing system 244 might have its own power supply.

As mentioned above, processing system 244 can comprise a plurality of processing devices, and each processing device can comprise multiple components, including microservers, memory devices, storage devices and the like. As used herein, a "microserver" is intended to refer to any device programmed to perform a specified limited set of functions, such as an EPROM. Merely by way of example, FIG. 2C provides a detailed illustration of an exemplary processing system 244, which comprises multiple processing devices 291. In accordance with the exemplified embodiment, transport medium 248 links processing system 244 with an external transport medium, perhaps via a discrimination device and/or interface, as described above.

Transport medium 248 can be coupled to a plurality of microservers 291 such that any information received by the processing system 244 via transport medium 248 may be routed to any of the microservers 291. Each microserver can, in some embodiments, be the equivalent of a server computer, complete with memory devices, storage devices, and the like, each of which is known in the art. In FIG. 2C, storage devices 293 associated with each of the microservers 291 are shown. Each of the microservers may be associated with one of the application devices 246 to provide information received from transport medium 248 and specifically processed for use by the corresponding device. Thus, the microservers 291 may individually be adapted to function as, for example, HTML microservers, authentication microservers, FTP microservers, TFTP microservers, DHCP microservers, WebServer microservers, email microservers, critical alert microservers, home-security microservers, VPN microservers, advertising microservers, instant-messaging microservers, wireless microservers, rf microservers, test-access microservers, data-security micro servers, and the like.

In addition to these functions, microservers 291 can be configured to route information sets received via transport medium 248, according to the type of telecommunication information in the set (e.g., encoded video, IP data, etc.) as well as any addressing information associated with either the set or the information it comprises (e.g., a specified destination port or network address for a particular subset of telecommunication information). In this way, microservers 291 can serve switching functions somewhat similar to that described with respect to discrimination device 232 described in relation to FIG. 2A. For instance, if IP data is received by microserver 291A, such data can be routed to an Ethernet connection, to the existing telephone wiring, e.g., in an HPNA implementation, or to any other appropriate medium, perhaps via an appropriate line driver. In fact, in certain embodiments, processing system 244, and in particular one or more of microservers 291, can incorporate the functionality of discrimination device 232 and/or aggregator 240, rendering those components optional. In some embodiments, one or more of the microservers may be adapted to function as a controller for the ANID 200, overseeing the ANID's state and monitoring performance. In some embodiments, the controller functions can be accessed using a web browser.

Processing system 244 can have multiple means of input and output. Merely by way of example, microservers 296 can communicate with one or more external transport media (perhaps, as discussed above, via intermediary devices) using one or more transport media (e.g., 248). Processing system 244 also can communicate with one or more internal transport media via a variety of information conduits, such as category 5, 5e and/or 6 unshielded twisted pair wire 268, RG6 and/or RG59 coaxial cable 264, and category 3 unshielded twisted pair copper (telephone) wire 252, again possibly via intermediary devices, as discussed with reference to FIG. 2A. Notably, some embodiments of processing system 244 can include interfaces for multiple transport media of a particular type, for instance, if processing system 244 serves as a networking hub, switch or router. Processing system 244 can also have infra-red and radio-frequency receivers and transmitters, for instance to allow use of a remote control device, as well as wireless transceivers, for instance to allow wireless (e.g., IEEE 802.11) networking.

Figure 3:
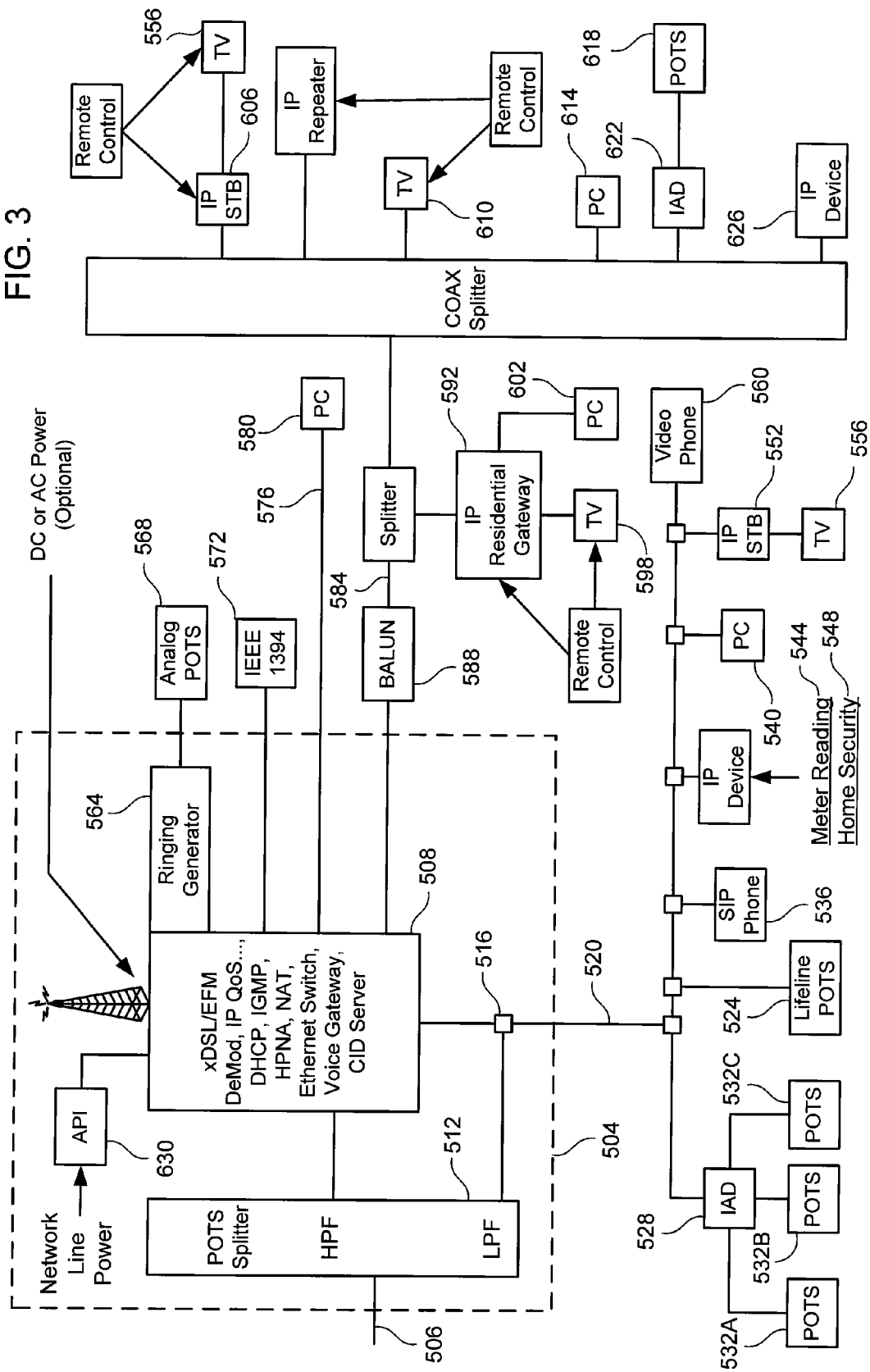
FIG. 3 provides an illustration of the use of a network interface system to provide a variety of telecommunications services to a customer premises according to embodiments of the invention.

FIG. 3 illustrates an exemplary system 500 in which an ANID 504 in accordance with certain embodiments of the invention is interconnected via several internal transport media to a wide variety of CPE, providing many different telecommunication services. ANID 504 is in communication with a telecommunication service provider's network via external transport medium 506, which can be any of the media described above; in this exemplary embodiment, it is a twisted pair copper "local loop," capable of carrying one or more POTS data sets and one or more xDSL information sets. ANID 504 can have a processing system 508 in communication with discrimination device 512, which can be a combined high pass/low pass filter. As mentioned above, discrimination device 512 can function to separate POTS information sets from non-POTS information sets, with the former routed to aggregator 516, which can serve as an interface to a category 3 twisted pair internal transport medium 520. Processing system 508 can also be in communication with aggregator 516, so that non-POTS information sets may be transmitted using transport medium 520 as well.

Attached to internal transport medium 520, which, in the illustrated embodiment can support the HPNA standard, can be a normal POTS telephone 524, along with an integrated access device, which, among other things, can provide POTS service via IP data transmitted via the HPNA network on internal transport medium 520. In the illustrated embodiment, three additional POTS telephones 532A, 532B, 532C are coupled to the integrated access device, although those skilled in the art will appreciate that certain embodiments will support different numbers and types of devices attached to the integrated access device. Also attached to transport medium 520 is a VoIP telephone 536, as well as a personal computer 540, which can use system 500 to access the Internet, among other things.

Further embodiments include an IP-compatible utility meter 544, which can allow a utility provider such as a city water department or electrical utility to monitor and bill utility usage over the Internet or the telecommunication service provider's network, and/or an IP-compatible home security system 548, which can allow the customer to monitor and control home security functions remotely. Via an Internet connection to ANID 504, a customer on vacation could administer home security system 548, view images from security cameras, check the status of all sensors, and even turn various lights in the house on and off.

Internal transport medium 520 can also be coupled to an 1P-compatible set-top box 552, which may have a television 556 attached. In addition, certain embodiments allow for a video phone 560 to be included in system 500 and attached to medium 520. Processing system 504 can also support a digital-to-analog converter 564 (perhaps with a ring generator), to allow direct connection of a POTS phone 568 to the ANID, perhaps for testing purposes.

As mentioned above, ANID 504 can support a variety of other interfaces and attachments as well. For example, in certain embodiments, ANID 504 (and more precisely processing system 508) can comprise one or more fiber optic interfaces, including for example, IEEE 1394 interface 572, as well a variety of standard Ethernet connections, including for example a category 5 10Base-T interface 576 that can be used, for example, to attach one or more personal computers (e.g., 580) to ANID 504, as well as a wireless interface 578. Processing system 508 can also include a coaxial (RG6 and/or RG59) interface, either through use of a balun 588 (to convert, for example, from twisted pair to coaxial cable) or through a direct coaxial connection to processing system 508.

Like the other interfaces, coaxial interface 584 can support a wide variety of CPE and associated services, including transmission of both a video (e.g., NTSC or PAL) information set and a data (e.g., IP data) information set, simultaneously. Supported devices can include an IP residential gateway, which can provide IP to NTSC/PAL conversion for video display on a television 598, as well as direct IP connectivity, for example, to provide Internet access to a personal computer 602. Through coaxial interface 584, ANID 504 can also communicate with an IP-compatible set-top box, as well as directly with a cable-ready television 610, a personal computer 614 (either via a coaxial connection on the computer or through a balun), a POTS telephone 618 (for instance, through an integrated access device 622), or to any other IP-compatible device 626, such as a utility meter, home security system or the like. As discussed above, ANID 504 can be programmable and/or addressable, and in some embodiments, ANID 504 can include an application programming interface 630 to facilitate in the programming and/or addressing of ANID 504.

Notably, different embodiments of the ANID can provide several benefits, including simultaneous video, data and voice transmission, while maintaining required Quality of Service levels for each particular information set. Further, some embodiments of the ANID can comprise a router that is capable of multi-protocol label switching ("MPLS"), which, those skilled in the art will recognize, allows the telecommunication service provider tremendous flexibility in designing the architecture of the external transport medium, including options, such as "Ethernet in the last mile" and tag switching, that provide enhanced features and performance across the provider's network. Various embodiments of the ANID also allow for a plurality of virtual private networks to be established through the ANID, allowing one or more secure data connections from the customer premises to other locations.

3. Implementation

Other embodiments of the invention include methods for providing telecommunication information to a transport medium internal to a customer premises. In some instances, such methods may make use of the ANID structure described above. Several such embodiments are therefore summarized with the flow diagram shown in FIG. 4. Specific details of how each of the steps shown in FIG. 4 may be implemented have been discussed at length above; accordingly, these steps are described only briefly in connection with FIG. 4. At block 704, telecommunication information is received from a first external transport medium. Such an external transport medium in many cases corresponds to a transport medium external to a customer premises. In many embodiments, the method may function only with telecommunication information received from a first external transport medium, although in other embodiments, telecommunication information may additionally be received from additional external transport media, as indicated at block 708.

The transport media internal to the customer premises and the transport media external to the customer premises are isolated at block 712, permitting a flow of telecommunication information between the internal and external transport media to be mediated at block 716. In some instances, the telecommunication information received from the one or more external transport media may include voice signals and non-voice-signals. Accordingly, in some such cases, the voice signals are separated from the non-voice-signals at block 720.

The received telecommunication information may thus be processed at block 728, such as by using one or more microservers in a processing system as described above. The processed information may then be transmitted to one or more addressable application devices at blocks 732 and 736 to permit implementation of the applications provided by such addressable application devices. The application devices implement their respective applications over the internal transport medium at block 740. In some instances, the functionality of the application devices may be changed by changing a state of the one or more addressable application devices in accordance with the new functionality at block 744.

Figure 4:
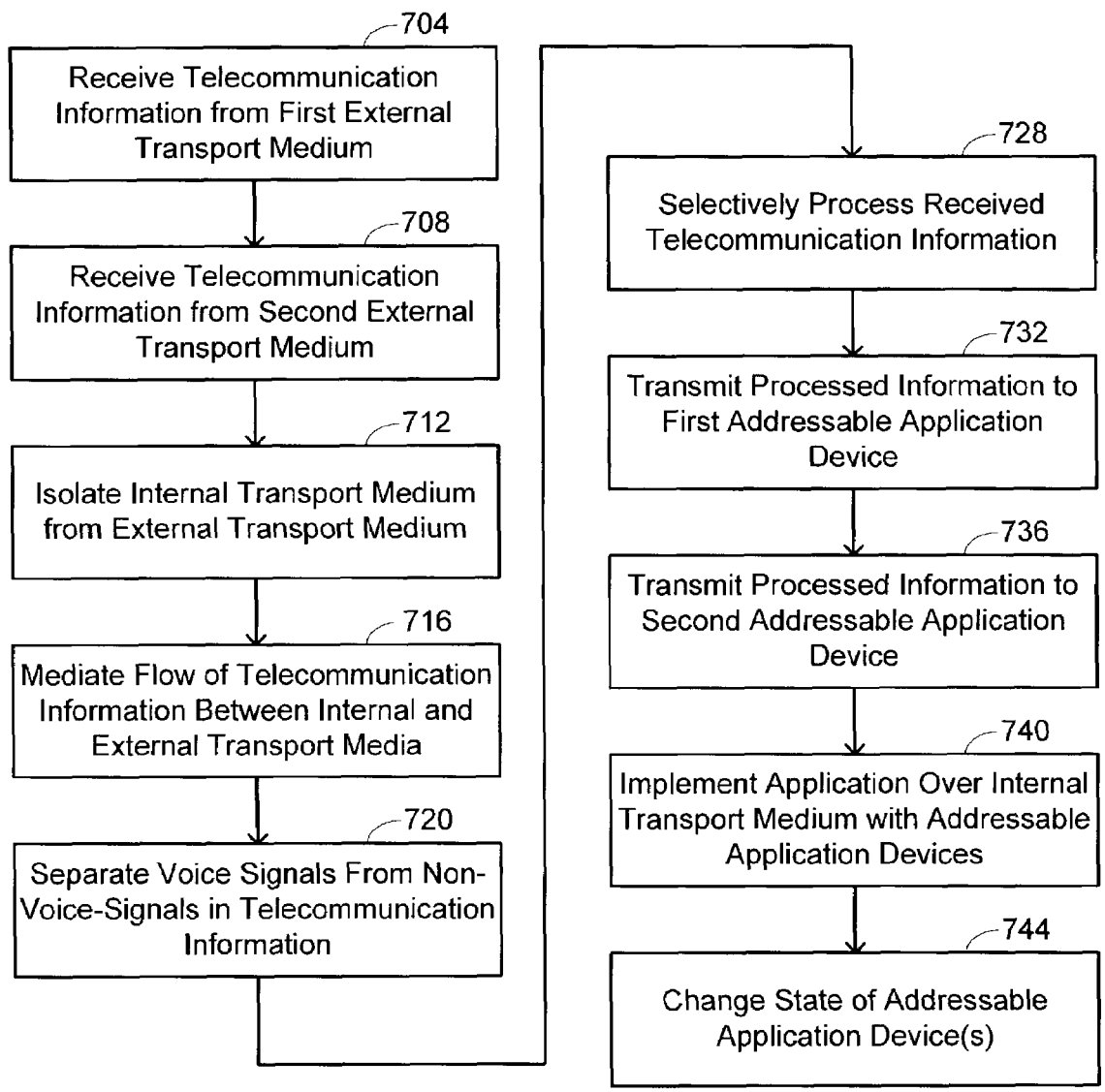
FIG. 4 is a flow diagram illustrating methods of providing telecommunication information according to embodiments of the invention.

Those of skill in the art will appreciate that while the blocks in FIG. 4 are provided in an exemplary order, there is no requirement that respective steps be performed in the order shown. In some embodiments, the respective steps may be performed in a different order. Also, there is no requirement that all of the steps shown in FIG. 4 be performed in a given embodiment since the telecommunication information may be provided to the internal transport medium in accordance with embodiments of the invention by performing a subset of the recited steps.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A network interface system comprising:
   an addressable application device adapted to interface with a transport medium internal to a customer premises; and
   a processor adapted to selectively process telecommunication information originating from a transport medium external to the customer premises, and to transmit the processed telecommunication information to the addressable application device for implementation of an application over the transport medium internal to the customer premises in accordance with a state of the addressable application device,
   wherein the addressable application device and the processor are disposed external to the customer premises.

2. The network interface system recited in claim 1 wherein the addressable application device and the processor are disposed on an exterior wall of the customer premises.

3. The network interface system recited in claim 1 wherein the addressable application device and the processor are disposed within a common housing.

4. The network interface system recited in claim 1 further comprising a service interface for addressing the addressable application device.

5. The network interface system recited in claim 4 wherein the service interface is a physical interface.

6. The network interface system recited in claim 4 wherein the service interface is a logical interface.

7. The network interface system recited in claim 1 further comprising an isolation device interfaced with the processor and adapted to isolate the transport medium internal to the customer premises from the transport medium external to the customer premises.

8. The network interface system recited in claim 7 wherein the isolation device is further adapted to mediate a flow of the telecommunication information between the transport media internal and external to the customer premises.

9. The network interface system recited in claim 7 wherein:
the telecommunication information comprises voice signals and non-voice-signals; and
the isolation device is further adapted to separate the voice signals from the non-voice-signals.

10. The network interface system recited in claim 1 wherein:
the telecommunication information is provided by a telecommunications service provider who maintains the transport medium external to the customer premises; and
the transport medium internal to the customer premises is maintained by a customer of the telecommunications service provider.

11. The network interface system recited in claim 1 wherein the processor is further adapted to selectively route telecommunication information originating from a second transport medium external to the customer premises to the addressable application device for implementation of the application over the transport medium internal to the customer premises in accordance with the state of the addressable application device.

12. The network interface system recited in claim 1 wherein the processor is further adapted to selectively route the telecommunication information to a second addressable application device for implementation of a second application over the transport medium internal to the customer premises in accordance with a state of the second addressable application device.

13. The network interface system recited in claim 12 wherein the second addressable application device is disposed external to the customer premises.

14. The network interface system recited in claim 1 wherein the transport medium external to the customer premises comprises an asynchronous transfer mode network.

15. The network interface system recited in claim 1 wherein the transport medium external to the customer premises comprises a vlan tag.

16. The network interface system recited in claim 1 wherein the transport medium external to the customer premises comprises an rf connection.

17. A method for providing telecommunication information to a transport medium internal to a customer premises, the method comprising:
receiving the telecommunication information from a transport medium external to the customer premises with a processor;
selectively processing the received telecommunication information with the processor;
transmitting the processed telecommunication information to an addressable application device disposed external to the customer premises; and
thereafter, implementing an application over the transport medium internal to the customer premises with the addressable application device.

18. The method recited in claim 17 further comprising addressing the addressable application device to change a state of the addressable application device that defines an implementation of the application.

19. The method recited in claim 18 wherein addressing the addressable application device comprises interacting physically with a service interface of the addressable application device.

20. The method recited in claim 18 wherein addressing the addressable application device comprises interacting logically with a service interface of the addressable application device.

21. The method recited in claim 17 further comprising isolating the transport medium internal to the customer premises from the transport medium external to the customer premises.

22. The method recited in claim 17 further comprising mediating a flow of the telecommunication information between the media internal and external to the customer premises.

23. The method recited in claim 17 wherein the telecommunication information comprises voice signals and non-voice-signals, the method further comprising separating the voice signals from the non-voice-signals.

24. The method recited in claim 17 wherein:
the telecommunication information is provided by a telecommunications service provider who maintains the transport medium external to the customer premises; and
the transport medium internal to the customer premises is maintained by a customer of the telecommunications service provider.

25. The method recited in claim 17 further comprising receiving the telecommunication information from a second transport medium external to the customer premises with the processor.

26. The method recited in claim 17 further comprising:
transmitting the processed telecommunication information to a second addressable application device; and
thereafter, implementing a second application over the transport medium internal to the customer premises with the second addressable application device.

27. The method recited in claim 26 wherein the second addressable application device is disposed external to the customer premises.

28. A network interface system comprising:
means for receiving the telecommunication information from a transport medium external to a customer premises;
means for selectively processing the received telecommunication information; and
means for implementing an application over a transport medium internal to the customer premises with the processed telecommunication information in accordance with a state of the means for implementing the application, wherein the means for selectively processing the received telecommunication information and the means for implementing the application are disposed external to the customer premises.

29. The network interface system recited in claim 28 wherein the means for selectively processing the received telecommunication information and the means for implementing the application are disposed within a common means for housing the means for selectively processing the received telecommunication information and the means for implementing the application.

30. The network interface system recited in claim 28 further comprising a service interface means for addressing the means for implementing the application.

31. The network interface system recited in claim 30 wherein the service interface means comprises a means for physically interfacing with the means for implementing the application.

32. The network interface system recited in claim 30 wherein the service interface means comprises a means for logically interfacing with the means for implementing the application.

33. The network interface system recited in claim 28 further comprising means for isolating the transport medium internal to the customer premises from the transport medium external to the customer premises.

34. The network interface system recited in claim 28 further comprising means for mediating a flow of the telecommunication information between the transport media internal and external to the customer premises.

35. The network interface system recited in claim 28 wherein:
   the telecommunication information comprises voice signals and non-voice-signals; and
   the network interface system further comprises means for separating the voice signals from the non-voice-signals.

36. The network interface system recited in claim 28 further comprising means for receiving the telecommunication information from a second transport medium external to the customer premises.

37. The network interface system recited in claim 36 further comprising second means for implementing a second application over the transport medium internal to the customer premises with the processed telecommunication information in accordance with a state of the second means for implementing the second application.

* * * * *

UNITED STATES PATENT AND TRADEMARK OFFICE
CERTIFICATE OF CORRECTION

PATENT NO. : 7,433,465 B2 Page 1 of 1
APPLICATION NO. : 10/367597
DATED : October 7, 2008
INVENTOR(S) : Steven M. Casey et al.

It is certified that error appears in the above-identified patent and that said Letters Patent is hereby corrected as shown below:

Title page, item [73] Name of Assignee: Oracle International Corporation should be corrected to read as follows:

Name of Assignee: Qwest Communications International Inc.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,433,465 B2  Page 1 of 1
APPLICATION NO. : 10/367597
DATED : October 7, 2008
INVENTOR(S) : Casey et al.

It is certified that error appears in the above-identified patent and that said Letters Patent is hereby corrected as shown below:

In column 2, line 31, delete "separated" and insert -- separate --, therefor.

In column 8, line 20, delete "nor" and insert -- or --, therefor.

In column 14, line 45-46, delete "11A and 11B." and insert -- 111A and 111B. --, therefor.

In column 14, line 63, delete "100'''''" and insert -- 100'''', --, therefor.

In column 23, line 52, delete "micro servers," and insert -- microservers, --, therefor.

In column 25, line 7, delete "1P" and insert -- IP --, therefor.

Signed and Sealed this

Twentieth Day of April, 2010

David J. Kappos
*Director of the United States Patent and Trademark Office*